United States Patent [19]
Tokizane et al.

[11] Patent Number: 5,307,058
[45] Date of Patent: Apr. 26, 1994

[54] REMOTE SUPERVISORY AND CONTROLLING SYSTEM

[75] Inventors: Toshiaki Tokizane; Yoshiharu Ito; Osamu Yamada; Toshiyuki Masuda; Mitsunobu Kuroda, all of Osaka, Japan

[73] Assignee: Matsushita Electric Works Ltd., Osaka, Japan

[21] Appl. No.: 703,719

[22] Filed: May 22, 1991

Related U.S. Application Data

[60] Continuation of Ser. No. 569,725, Aug. 21, 1990, abandoned, which is a continuation of Ser. No. 379,464, Jul. 13, 1989, abandoned, which is a division of Ser. No. 218,176, Jul. 13, 1988, abandoned.

[30] Foreign Application Priority Data

Oct. 27, 1987 [JP] Japan .................. 62-271061
Nov. 26, 1987 [JP] Japan .................. 62-298738

[51] Int. Cl.⁵ .............................. G08C 19/00
[52] U.S. Cl. .............................. 340/825.070
[58] Field of Search ............. 340/825.07, 825.08, 340/310 A, 310 R

[56] References Cited

U.S. PATENT DOCUMENTS

| | | | |
|---|---|---|---|
| 3,964,023 | 6/1976 | Fauchez | 340/310 A X |
| 4,156,866 | 5/1976 | Miller . | |
| 4,168,531 | 9/1979 | Eichelberger et al. . | |
| 4,185,272 | 1/1980 | Freker | 340/310 A X |
| 4,213,182 | 6/1984 | Eichelberger et al. . | |
| 4,367,414 | 1/1983 | Miller et al. . | |
| 4,393,501 | 7/1983 | Kellogg et al. . | |
| 4,418,333 | 11/1983 | Schwarzbach et al. | 340/310 A |
| 4,425,628 | 1/1984 | Bedard et al. . | |
| 4,535,401 | 8/1985 | Penn | 340/210 R X |
| 4,562,550 | 12/1985 | Beatty et al. . | |
| 4,574,355 | 3/1986 | Beatty et al. . | |
| 4,608,561 | 8/1986 | Kojima et al. . | |
| 4,780,872 | 10/1988 | Masuda et al. . | |
| 4,819,228 | 4/1989 | Baran et al. | 370/85.1 |
| 4,888,769 | 12/1989 | Deal | 370/85.1 |
| 4,908,822 | 3/1990 | Wroblewski | 370/85.1 |

FOREIGN PATENT DOCUMENTS

4540885 6/1989 Australia .
58-28956 6/1983 Japan .
60-59716 12/1985 Japan .

OTHER PUBLICATIONS

T. K. McGowan & G. E. Feiker "A New Approach to Lighting Control", Journal of I.E.S. Oct. 1976, pp. 38-43.

Primary Examiner—Ulysses Weldon
Attorney, Agent, or Firm—Sughrue, Mion, Zinn, Macpeak & Seas

[57] ABSTRACT

A remote supervisory and controlling System for remotely supervising and controlling loads in time-divisional multiplex transmission of control and monitor data between a central control and terminal units each connected to the central control unit through a two-wire line. Supervision and control of the overall system can be carried out from a plurality of locations so that failure of a central or host computer will not render the overall system inoperative.

4 Claims, 28 Drawing Sheets

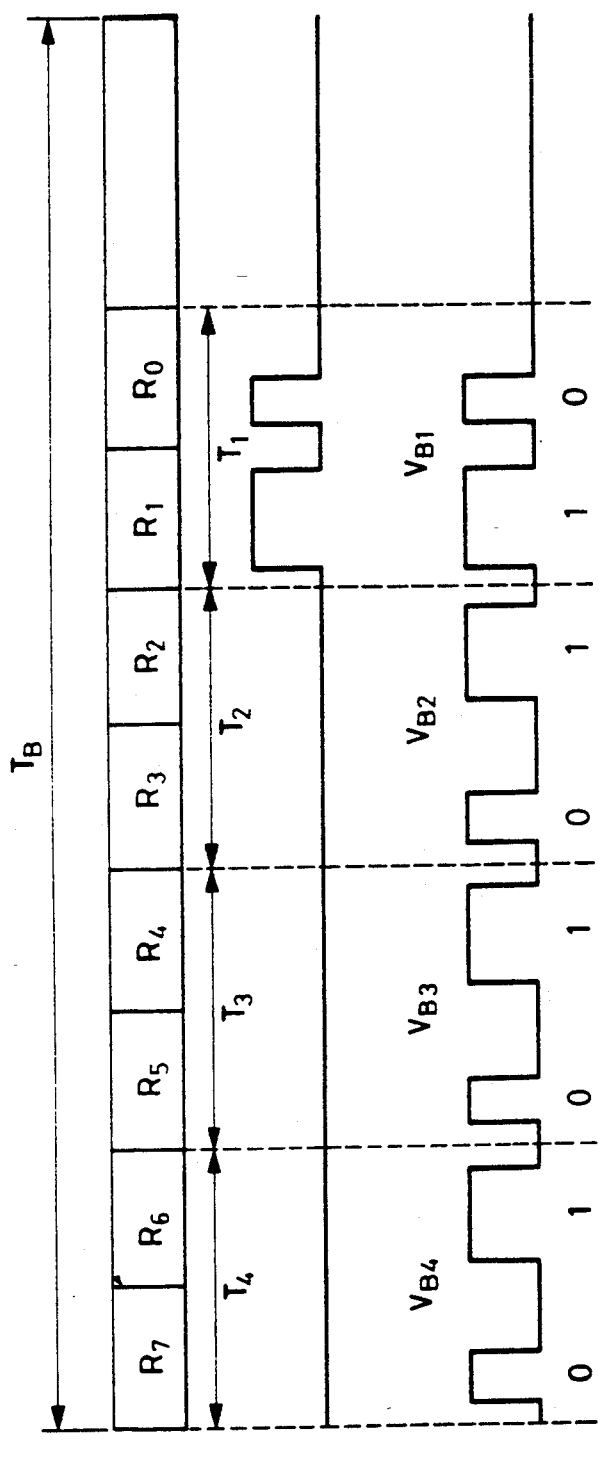
FIG. 6(a) $v_S$
FIG. 6(b) $v_B$
FIG. 6(c) $v_B'$ (a) OPTICAL WIRELESS SIGNAL (b) BASE-BAND SIGNAL

FIG. 30

| MODE DATA | | TRANSMISSION DATA | | | | | | | |
|---|---|---|---|---|---|---|---|---|---|
| UPPER | LOWER | 0 | 1 | 2 | 3 | 4 | 5 | 6 | 7 |
| 0 | 0 | 0CH LOAD-1 ON | 0CH LOAD-1 OFF | 0CH LOAD-2 ON | 0CH LOAD-2 OFF | 0CH LOAD-3 ON | 0CH LOAD-3 OFF | 0CH LOAD-4 ON | 0CH LOAD-4 OFF |
| 0 | 1 | 1CH LOAD-1 ON | 1CH LOAD-1 OFF | 1CH LOAD-2 ON | 1CH LOAD-2 OFF | 1CH LOAD-3 ON | 1CH LOAD-3 OFF | 1CH LOAD-4 ON | 1CH LOAD-4 OFF |
| 0 | 2 | 2CH LOAD-1 ON | 2CH LOAD-1 OFF | 2CH LOAD-2 ON | 2CH LOAD-2 OFF | 2CH LOAD-3 ON | 2CH LOAD-3 OFF | 2CH LOAD-4 ON | 2CH LOAD-4 OFF |
| 0 | 3 | 3CH LOAD-1 ON | 3CH LOAD-1 OFF | 3CH LOAD-2 ON | 3CH LOAD-2 ON | 3CH LOAD-3 ON | 3CH LOAD-3 OFF | 3CH LOAD-4 ON | 3CH LOAD-4 OFF |
| 0 | 4 | 4CH LOAD-1 ON | 4CH LOAD-1 OFF | 4CH LOAD-2 ON | 4CH LOAD-2 OFF | 4CH LOAD-3 ON | 4CH LOAD-3 OFF | 4CH LOAD-4 ON | 4CH LOAD-4 OFF |
| 0 | 5 | 5CH LOAD-1 ON | 5CH LOAD-1 OFF | 5CH LOAD-2 ON | 5CH LOAD-2 OFF | 5CH LOAD-3 ON | 5CH LOAD-3 OFF | 5CH LOAD-4 ON | 5CH LOAD-4 OFF |

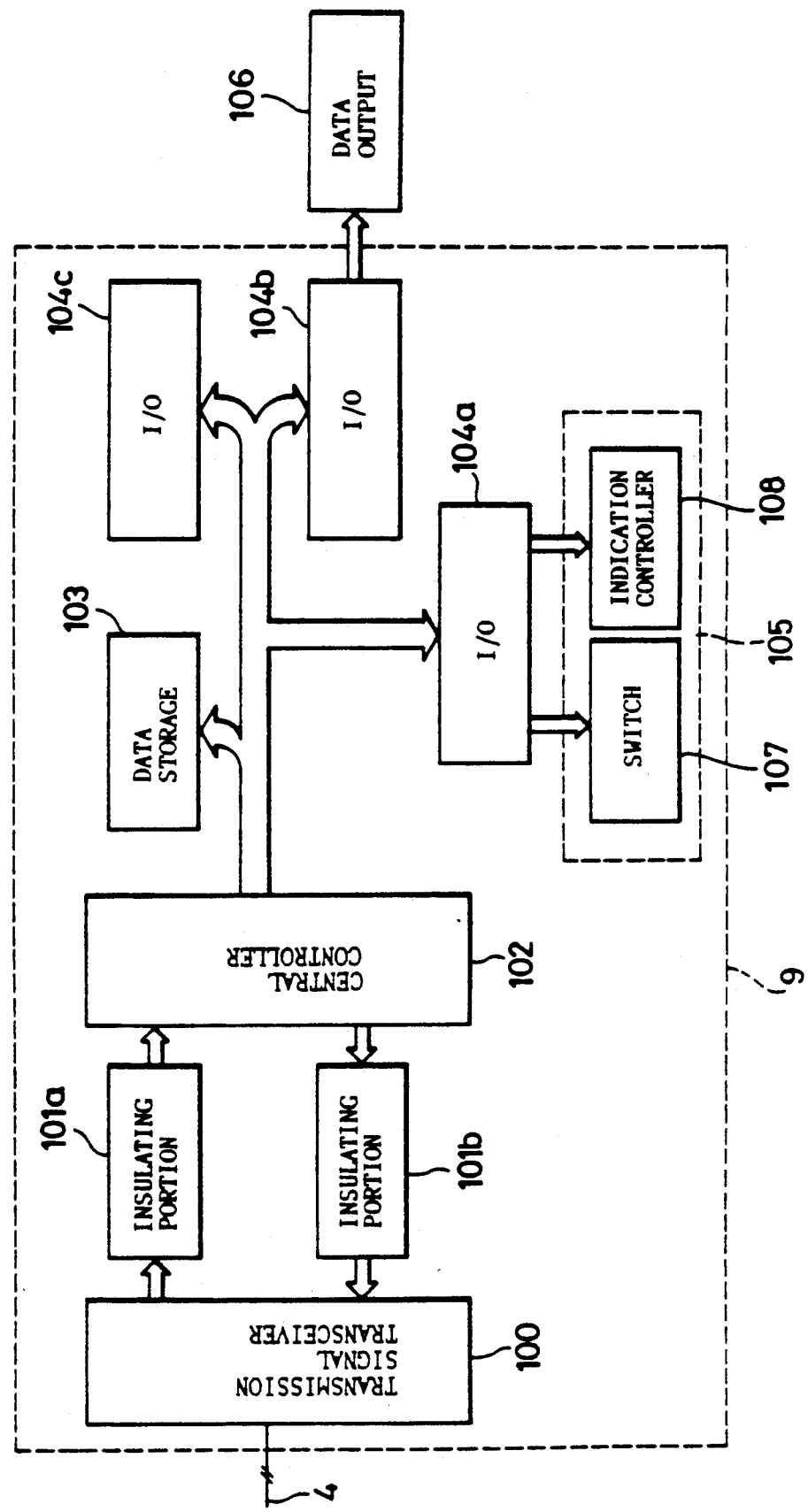

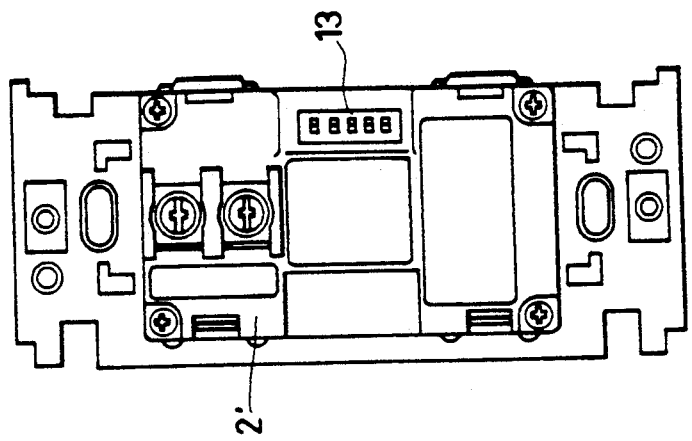
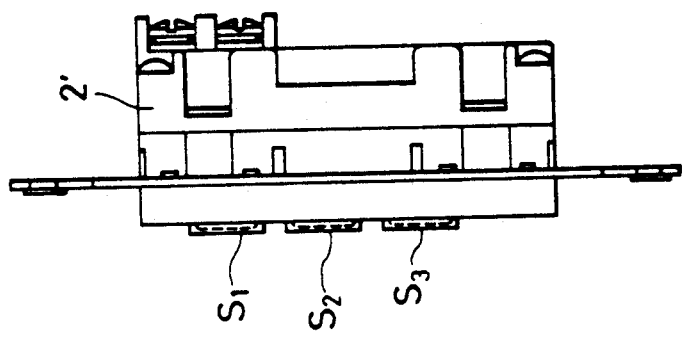
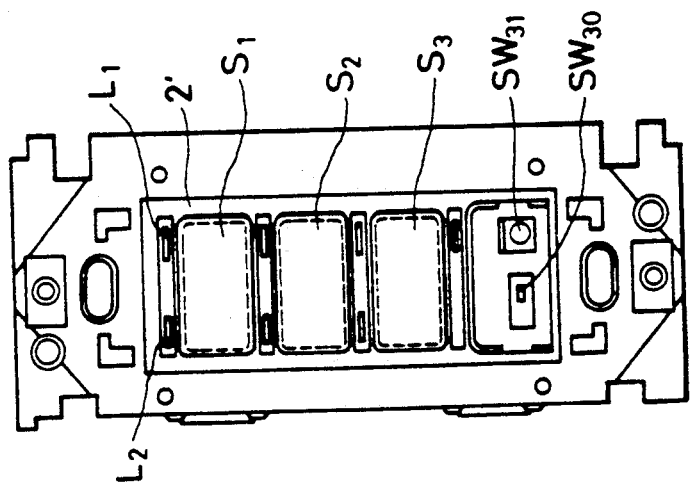

REMOTE SUPERVISORY AND CONTROLLING SYSTEM

This application is a continuation of Ser. No. 569,725, filed on Aug. 21, 1990, now abandoned, which is a continuation of Ser. No. 379,464, filed on Jul. 13, 1989, now abandoned, which is a division of Ser. No. 218,176, filed on Jul. 13, 1988, now abandoned.

BACKGROUND OF THE INVENTION

The present invention relates to remote supervisory and controlling systems. More particularly, the invention relates to a system for remotely supervising and controlling loads in time-divisional multiplex transmission of -control and monitor data between a central control and terminal units each connected to the central control unit through a two-wire line.

In carrying out the remote supervision and control of loads by a host computer, as shown in FIG. 37 and as described in U.S. Pat. No. 4,213,182, loads $L_l$ to $L_n$ have been controlled directly by a host computer 110 through a media interface 120 and load control processors 121 provided for remote supervision and control. Briefly, the host computer 110 includes a CPU ill for performing computing operations, a ROM 112 for storing a system program, a RAM 113 for storing user's programs, an I/O 114 for data input/output, a data storage means 115 for storing monitor and control data, a real time clock 116 and a power means 117. After a suitable program for controlling and supervising the loads $L_l$ to $L_n$ has been stored in the RAM 113, the CPU 111 executes the program to effect data generation for controlling and supervising the loads $L_l$ to $L_n$ on the basis of the monitor and control data stored in the data storage means 115 and to carry out signal transmission for controlling and supervising the loads $L_l$ to $L_n$ through the I/O 114 and the media interface 120. The load control processor 121 receives the signal transmitted through the media interface 120 to perform load control and supervision in accordance with instructions from the host computer 110.

In such a prior art system, however, the media interface 120 for supervision and control is controlled directly by the host computer 110, and there has therefore been a problem in that if the host computer 110 becomes faulty for some reason, the entire remote supervisory and controlling system cannot operate, making it impossible to carry out any supervision and control over the loads $L_l$ to $L_n$. Further, in the prior art remote supervisory and controlling system, there has been another problem in that it is difficult to connect a plurality of the host computers 110 to the media interface 120, and hence the loads $L_l$ to $L_n$ cannot be remotely controlled from a plurality of places.

SUMMARY OF THE INVENTION

It is therefore an object of the present invention to eliminate the foregoing problems in the prior art systems.

It is another object of the present invention to provide a remote supervisory and controlling system to which a plurality of external control units can be suitably connected so that supervision and control of loads can be performed from a plurality of places.

It is a further object of the present invention to provide a remote supervisory and controlling system which is free from failure of the whole system, even if some external control unit fails.

In order to attain the above objects, according to one aspect of the present invention, in a remote supervisory and controlling system comprising a central control unit and a plurality of terminal units, the plurality of terminal units being connected to the central control unit through a two-wire signal line so that the central control unit sends out a transmission signal including an address data signal for calling each of the terminal units, a control data signal for controlling a load associated with each of the terminal units, a return wait signal for setting a period of returning a monitor data signal from each of the terminal units to thereby perform time-divisional multiplex transmission of the monitor data and the control data between the central control unit and each of the terminal units, there is provided an external interface for time-divisional data transmission through the signal line between the central control unit and an external control unit such as a host computer, whereby a plurality of external control units can be desirably connected to the system to thereby perform load supervision and control from a plurality of places in such a manner as to be free from failure of the whole system, even if any one of the external control units fails.

It is also an object of the present invention to provide a remote supervisory and controlling system in which controlling operations can be carried out by an optical wireless signal.

It is a further object of the present invention to provide a remote supervisory and controlling system in which pattern control data can be entered simply.

BRIEF DESCRIPTION OF THE DRAWINGS

Other features and advantages of the present invention will be apparent from the following description taken in connection with the accompanying drawings, wherein:

FIGS. 6a through 9 are diagrams used for explaining the operation of the FIG. 1 embodiment;

FIG. 30 is a diagram showing the arrangment of mode and transmission data;

FIG. 31 is a block circuit diagram of a pattern setting terminal;

FIGS. 36A, 36B, and 36C are a front view, a side view, and a rear view of a main part of the FIG. 35 embodiment.

DETAILED DESCRIPTION OF THE PREFERRED EMBODIMENTS

Figure 1:
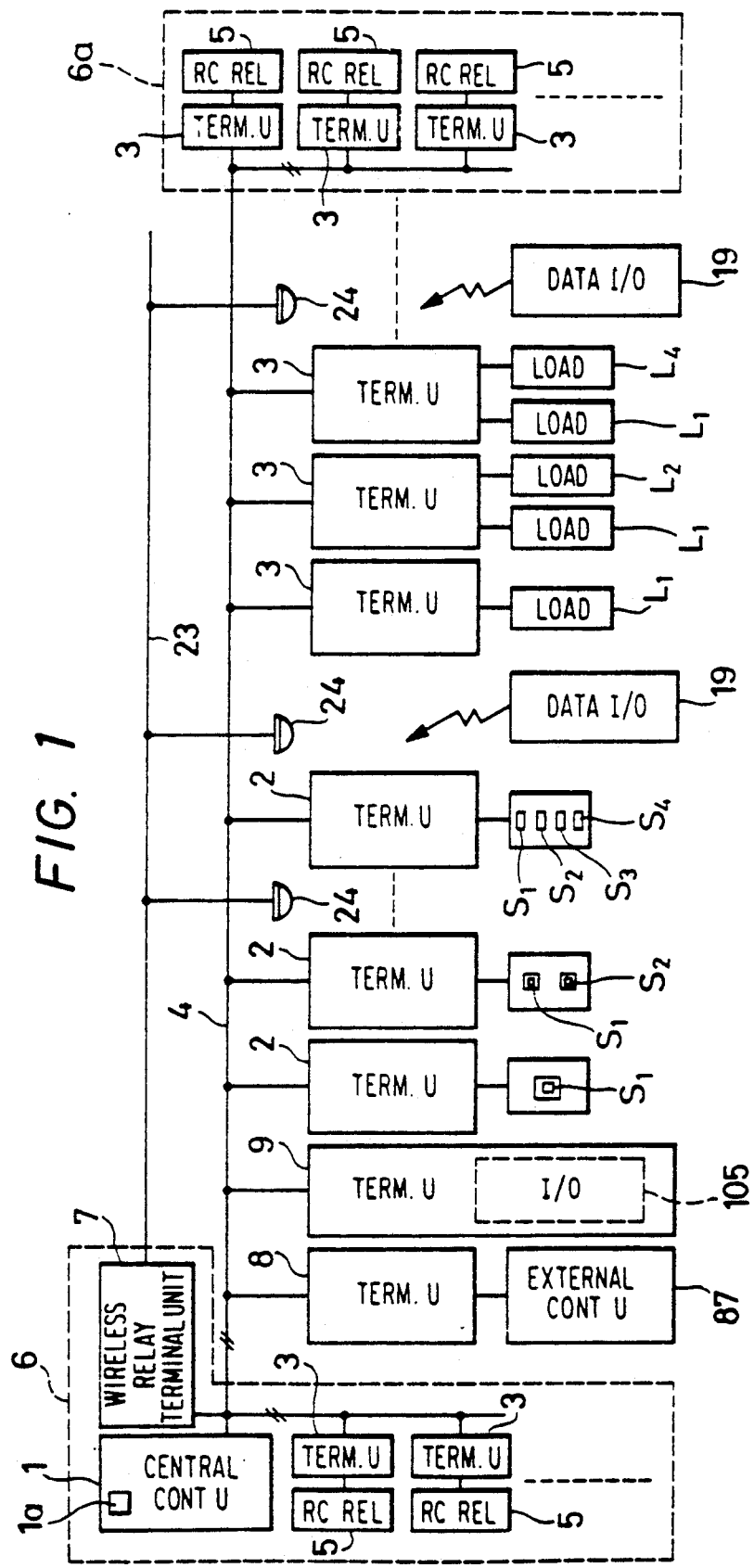
FIG. 1 is a schematic block diagram showing a general arrangement of a preferred embodiment of a remote supervisory and controlling system according to the present invention.
Figures 2A, 2B:
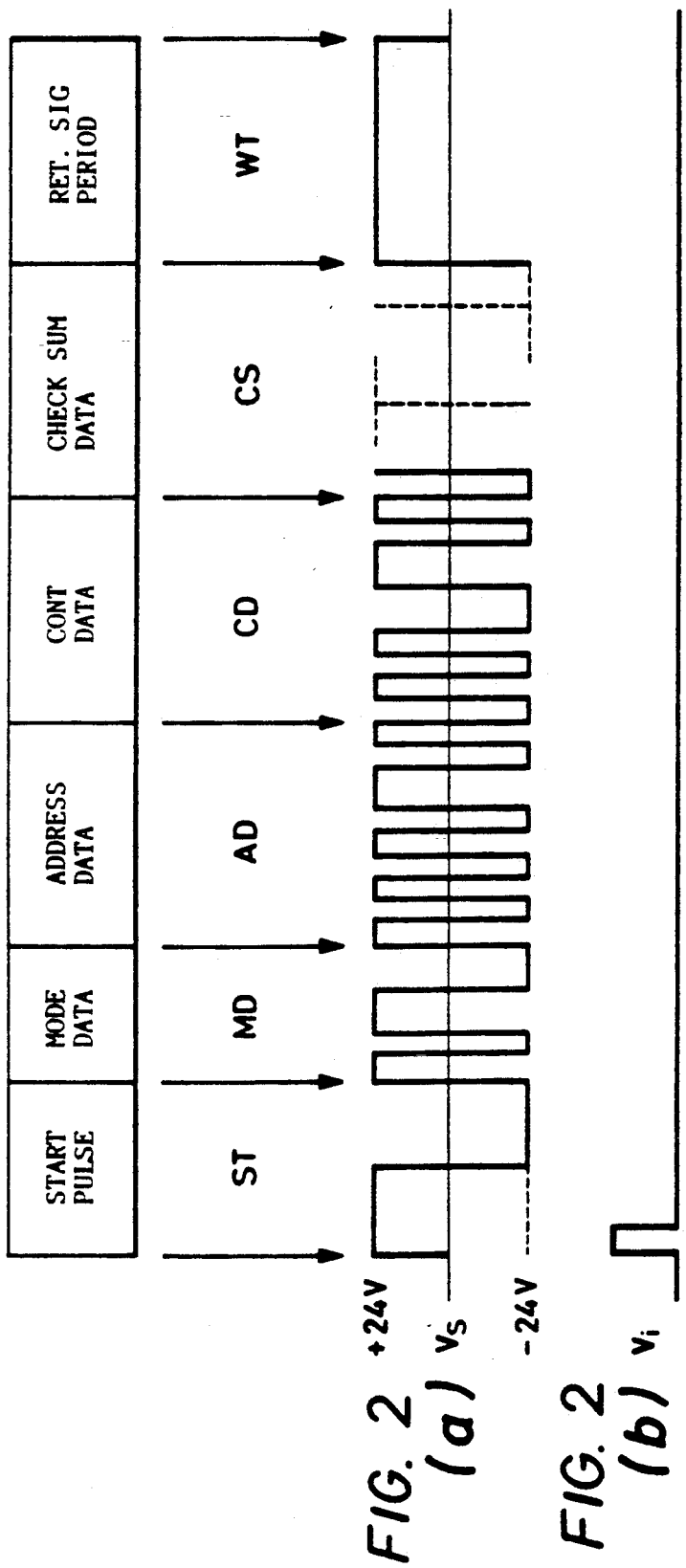
FIGS. 2a and 2b show waveform diagrams used for explaining the operation of the embodiment of FIG. 1.

Referring to FIG. 1, a first embodiment of a remote supervisory and controlling system according to the present invention includes a central control unit 1, a plurality of monitor terminal units 2, and a plurality of control terminal units 3. Specific addresses are set in the respective terminal units 2 and 3, and all the terminal units 2 and 3 are connected to the central control unit 1 through a two-wire signal line 4. A transmission signal vs sent out onto the signal line 4 from the central control unit 1 is a bipolar time-divisional multiplex transmission signal (24 V) which contains, as shown in FIG. 2, a start pulse signal ST indicative of the start of the transmission signal, a mode data signal MD indicative of the signal mode, an address data signal AD for calling any one or more of the terminal units 2 and 3, a control data signal CD for controlling loads $L_1$-$L_4$, a check sum data signal CS and a return wait signal WT for setting the period of a return signal from the terminal units 2 and 3. The data transmission is performed using a pulse-width modulation technique.

Each of the terminal units 2 and 3 is arranged so that when the address data of the transmission signal Vs received through the signal line 4 by the terminal unit coincides with its own specific address data, the terminal unit accepts the control data of the transmission signal Vs and sends out a monitor data signal as a current mode signal (a signal sent back by short-circuiting two wires of the signal line 4 through a low impedance to attain a constant current) in synchronism with the return wait signal WT of the transmission signal $V_s$.

Figure 28:
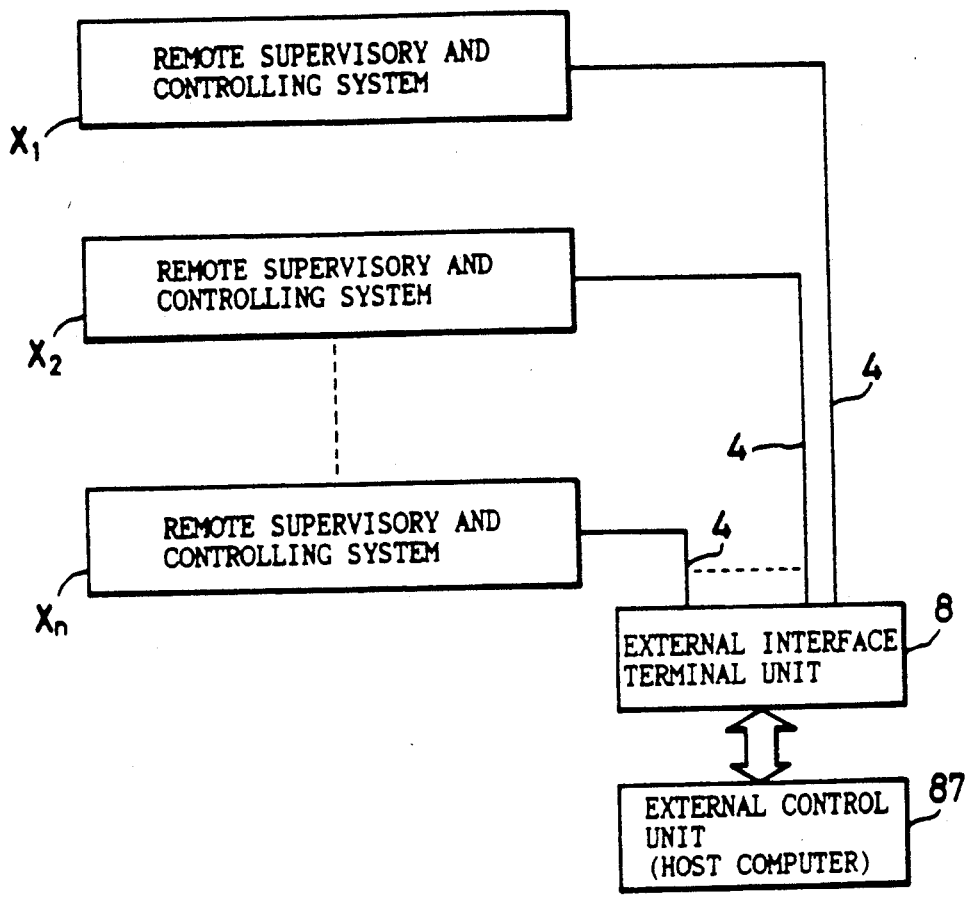
FIGS. 28 and 29 are schematic diagrams of still further embodiments of the invention.

The central control unit I is provided with a dummy signal transmission unit for continuously sending out a dummy transmission signal $V_s$ containing a mode data signal MD indicative of a dummy mode, and an interrupt processing unit responsive to an interrupt signal $V_i$ returned to the unit, as shown in FIG. 28, for processing the interrupt by detecting the identity of the one of the monitor terminal units 2 which has generated the interrupt signal and accessing the detected terminal unit to cause it to return its monitor data to the central control unit 1. On the other hand, each of the monitor terminal units 2 is provided with an interrupt signal generating unit which is responsive to the occurrence of monitor input through the operation of switches $S_1$-$S_4$ for generating the interrupt signal Vi in synchronism with the start pulse signal ST of the dummy transmission signal vs and returning the specific address data for the unit 1 to the central control unit 1 in an address confirmation mode in synchronism with the return wait signal WT of the transmission signal Vs, and a data return unit which is responsive to an interrupt-access mode transmission signal from the central control unit 1 for returning the monitor data corresponding to the monitor input. The central control unit 1 provides the control data to be transmitted to the control terminal unit 3 on the basis of the monitor data returned from the monitor terminal unit 2 to the central control unit 1, so that the loads $L_1$-$L_4$ can be controlled in accordance with the control data transmitted to the control terminal unit 3.

Each of the control terminal units 3, having a unified size according to the Japanese Industrial Standard (C-8370, Supplement 5), is installed on a distribution board 6 or relay control board 6a so that a remote control relay (a latching relay capable of being operated also by a hand switch) 5 for controlling the loads can be controlled by the control output of the control terminal unit 3. The central control unit 1 may include a delay timer function for delaying the load control by a predetermined time period from the switching operation so that the turning off of the lighting loads can be delayed even if ordinary monitor terminal units 2 are used. The central control unit 1 also may include a function of storing data of light intensities corresponding to the various switches, so that the lighting intensities of the loads can be adjusted even if ordinary monitor terminal units are used.

Figure 3:
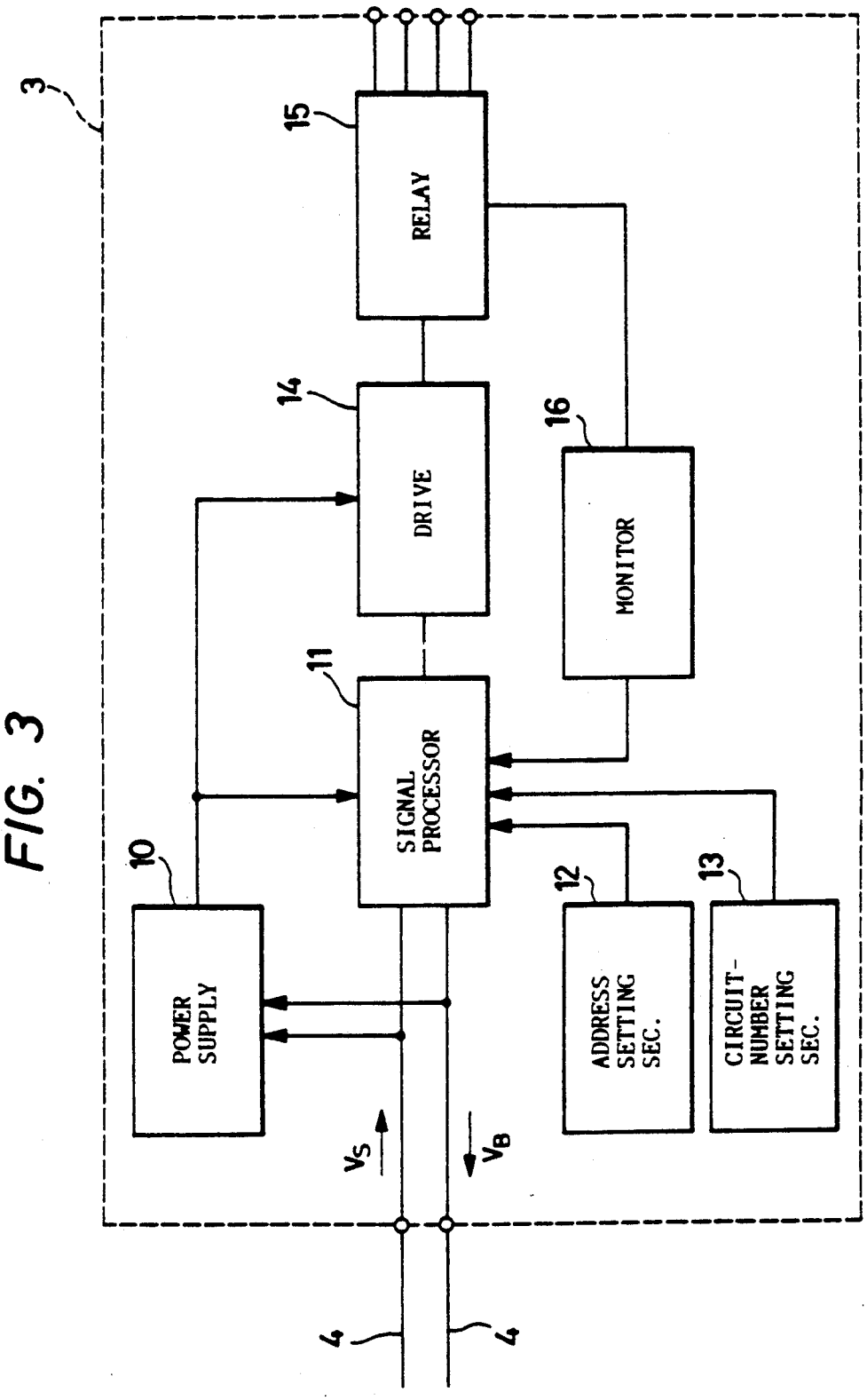
FIGS. 3 and 4 are circuit diagrams of terminal units used in the FIG. 1 embodiment.

FIG. 3 shows the circuit arrangement of each of the control terminal units 3. The control terminal unit 3 is constituted by a power supply circuit 10 which is activated as a circuit power source in response to the transmission signal Vs transmitted through the signal line 4, a signal processing circuit 11 responsive to the transmission signal $V_s$ to generate a return signal $V_B$, an address setting section 12 for setting a specific address, a circuit number setting section 13 for determining which one of four control circuits (represented by the bits of a four-bit control datum) should control a given load, a drive circuit 14 for driving a load-controlling relay circuit 15, and a monitoring circuit 16 for monitoring various operational conditions. The signal processing circuit 11 is arranged so that the signal processing circuit 11 detects coincidence between the address data of the transmission signal Vs and the specific address, and upon detection of coincidence, the signal processing circuit 11 accepts the control data from the signal Vs to generate a control output for operating the output relay 15 on the basis of the bits selected by the circuit number setting section and also generates a return monitor datum to be returned to the central control unit 1 through the return signal $V_B$ in the current mode, on the basis of the load monitor input sent through the monitoring circuit 16 from the relay circuit 15.

Although this embodiment has been described with respect to a circuit number setting section 13 provided in each of the control terminal units 3, it is a matter of course that relay circuits 15 may be arranged so as to control the respective loads as commanded by the respective bits of the control data without the provision of such a circuit number setting section 13.

Figure 4:
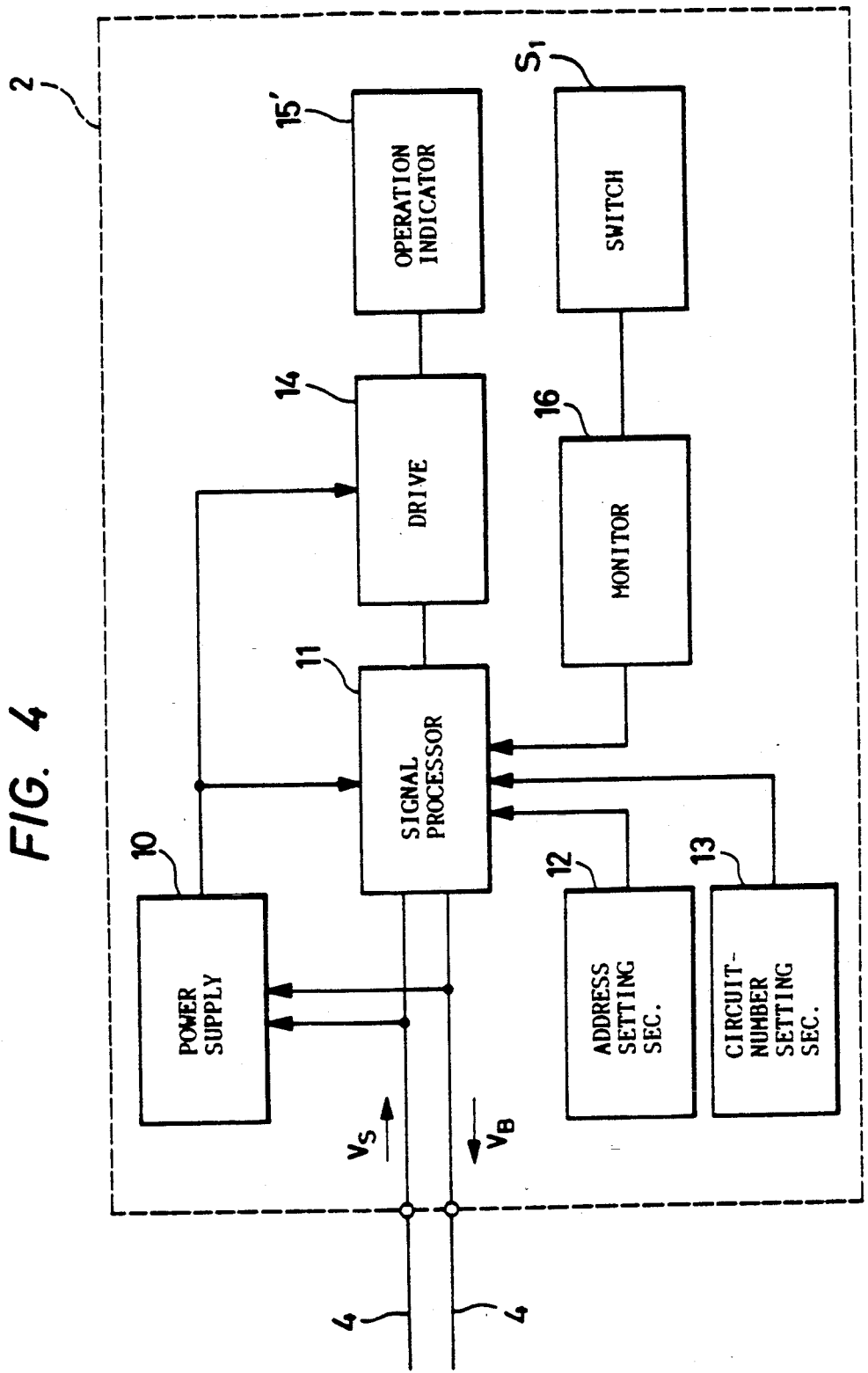
Figure 5A:
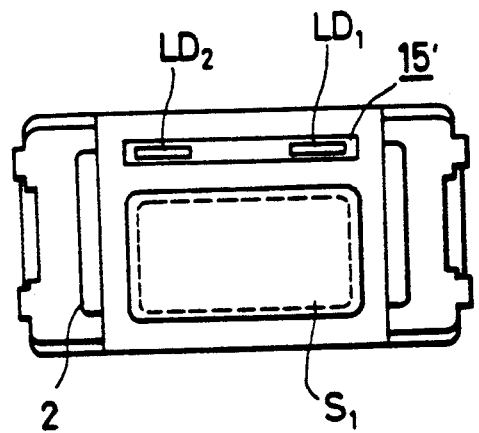
FIGS. 5A, 5B, and 5C are a front view, a side view, and a rear view of a main part of the FIG. 1 embodiment.
Figure 5B:
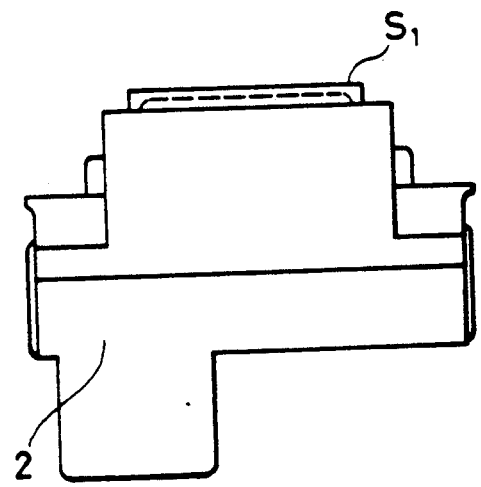
Figure 5C:
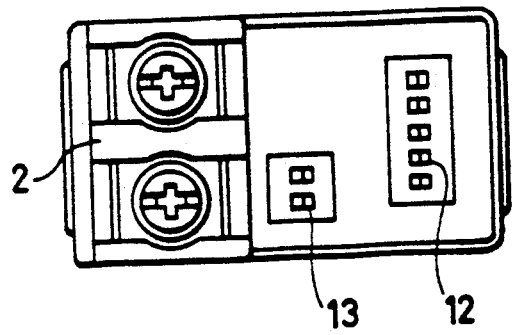

FIG. 4 shows the circuit arrangement of the monitor terminal unit 2, which is substantially the same as that of the control terminal unit 3. The condition of the switch $S_1$ is monitored by the monitoring circuit 16 and a monitor datum is generated by the signal processing circuit 11 on the basis of the switch monitor input and returned to the central control unit 1 by the aforementioned interrupt processing. Light-emitting diodes $LD_1$ and $LD_2$ for ON and OFF indication of the operational indicating circuit 15' are operated on the basis of this control data (showing the operating condition of the load) transmitted from the central control unit 1. The address setting section 12 includes a DIP switch for setting the specific address. In setting the specific address for each of the terminal units, desirably, eight-bit address data are employed, the lower six bits of which are for use by the user and the upper two bits of which are for use by the manufacturer. Therefore, the respective addresses for the monitor and control terminal units 2 and 3 are to be set in such a manner that, for example, the user bits are set to have the same value for all the units to thereby establish correspondence between each of the monitor and control terminal units 2 and 3. Thus, the address of the terminal unit 3 can be easily set corresponding to that of the terminal unit 2. Accordingly, the load $L_l$ connected to the control terminal unit 3 can be controlled on the basis of the monitor data of the switch $S_1$ returned from one of the monitor terminal units 2 of the same bit value.

If, for example, the first and second bits of the address data for each of the monitor terminal units 2 and for each of the control terminal units 3 as well are fixedly set by the manufacturer to be "0,0" and "0,1", respectively, and the third to eight bits of the address data are left to be settable by the user, addresses 0 to 63 are allocated to the monitor terminal units 2 while addresses 128 to 191 are allocated to the control terminal units 3. When, for example, the operation states of the switches $S_1$, $S_2$ . . . are monitored by the monitor terminal units 2, the circuit number setting section 13 can be omitted as long as the operational states of the switches $S_1$, $S_2$ . . . are detected by the monitoring circuit 16. Also the monitor terminal units 2 for monitoring the operational states for pattern control are arranged in the same manner as those for monitoring the operational states of the aforementioned individual control switches.

A description will now be given concerning the case where a plurality of dispersed loads are individually controlled by a plurality of control terminal units 3 of the same address. It is now considered that the same address has been allocated to the plurality of terminal units 3, the control circuits of the terminal units 3 to be connected to the loads are set by the circuit number setting section 13, the return periods $T_B$ set by the return wait signal WT are divided and allocated to the respective circuits, and the monitor data from the respective terminal units 3 of the same address are returned in the divided return periods $T_1$ to $T_4$, respectively.

FIG. 6 shows an example of division of the return period $T_B$. As shown in diagram (a) of FIG. 6, the return period $T_B$ is divided in the form of a two-bit data (load ON "1,0" and load OFF "0,1") as "$R_0,R_1$", "$R_2,R_3$", "$R_4,R_5$" and "$R_6,R_7$" to thereby set four divisional return periods $T_1$ to $T_4$ corresponding to the respective control circuits. Accordingly, the return signal $V_B$, Pulse-width-modulated with the monitor data in the divided return periods $T_1$ to $T_4$, can be returned. Diagram (b) of FIG. 6 shows the case where the monitor data is returned from the terminal unit 3 in which the No. 1 control circuit has been set. In this case, bit data is returned in the divided return period $T_1$ corresponding to the No. 1 control circuit.

Diagram (c) of FIG. 6 shows an example of a return signal (a signal on the signal line 4) formed by synthesizing four return signals $V_{B1}$ to $V_{B4}$ returned from four terminal units 3 in the case where the same address is allocated to the four control terminal unit 3 and loads are connected to the other control circuits of the respective terminal units 3. The return signals $V_{B1}$ to $V_{B4}$ are returned from the terminal units 3 in the divisional return periods $T_1$ to $T_4$, respectively, by which there is no occurrence of interference or signal collision. Accordingly, no malfunction caused by transmission errors due to interference or collision can occur, even in the case where the same address is allocated to a plurality of the terminal units 3. It is a matter of course that the same address may be allocated to a plurality of monitor terminal units 2 for monitoring one switch to thereby return switch-monitor data in the divisional return periods $T_1$ to $T_4$.

When the same address is allocated to a plurality of monitor terminal units 2 to return the switch-monitor data in the divisional return periods $T_1$ to $T_4$, and interrupt processing is carried out by setting an input latch corresponding to the change of monitor input, the input latch, undesirably, may be reset by the end-of-interrupt signal of the data return of the prior monitor input because the monitor input signals of the monitor terminal units 2 change almost simultaneously. This causes a problem in that the change of the monitor input after the change of the prior monitor input may be ignored. In this embodiment, therefore, an input latch having bits corresponding to the monitor input is provided, and the aforementioned problem is eliminated by resetting the input latch, bit by bit, after interrupt processing is terminated.

Figure 7A:
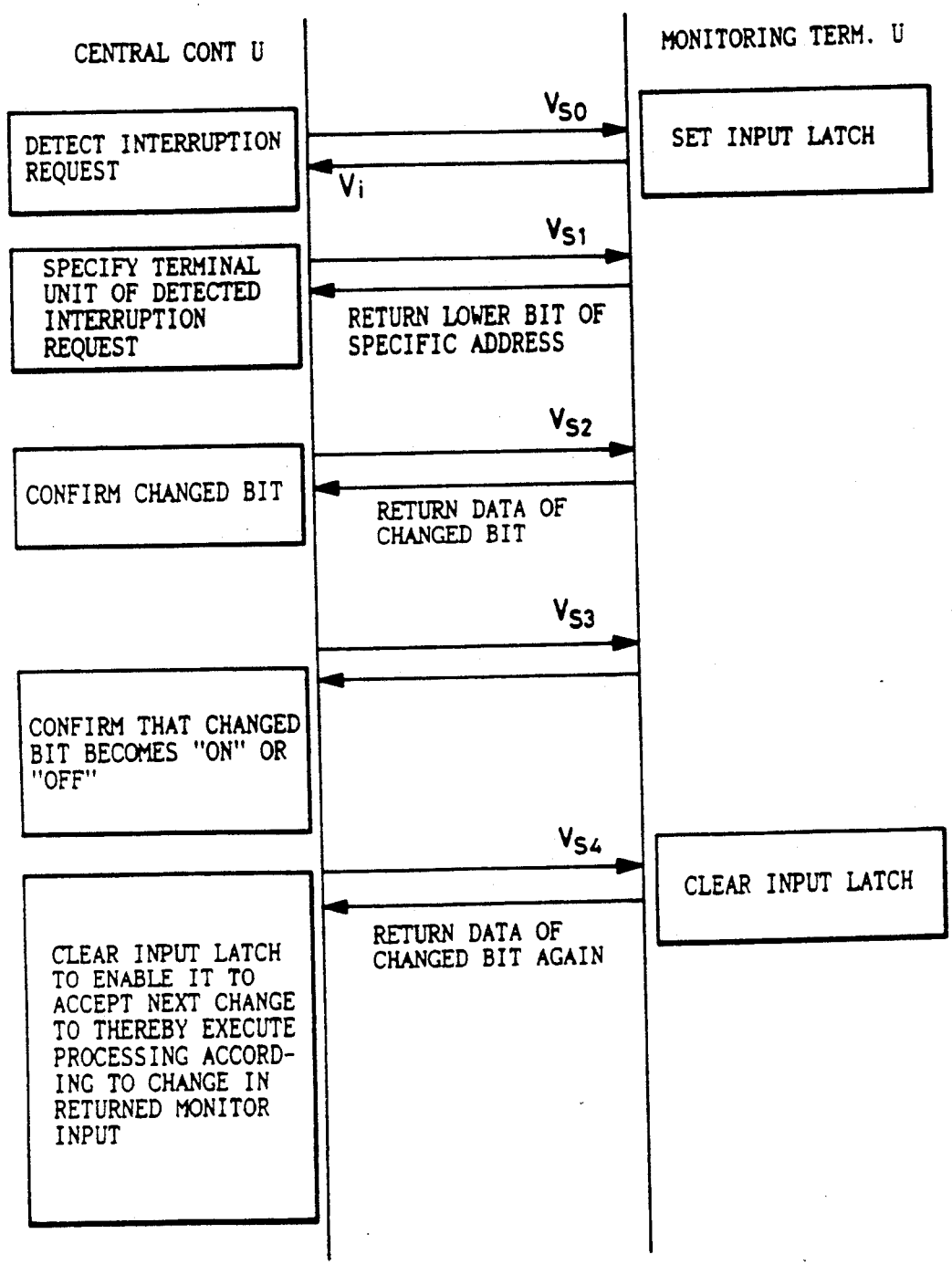
Figure 7B:
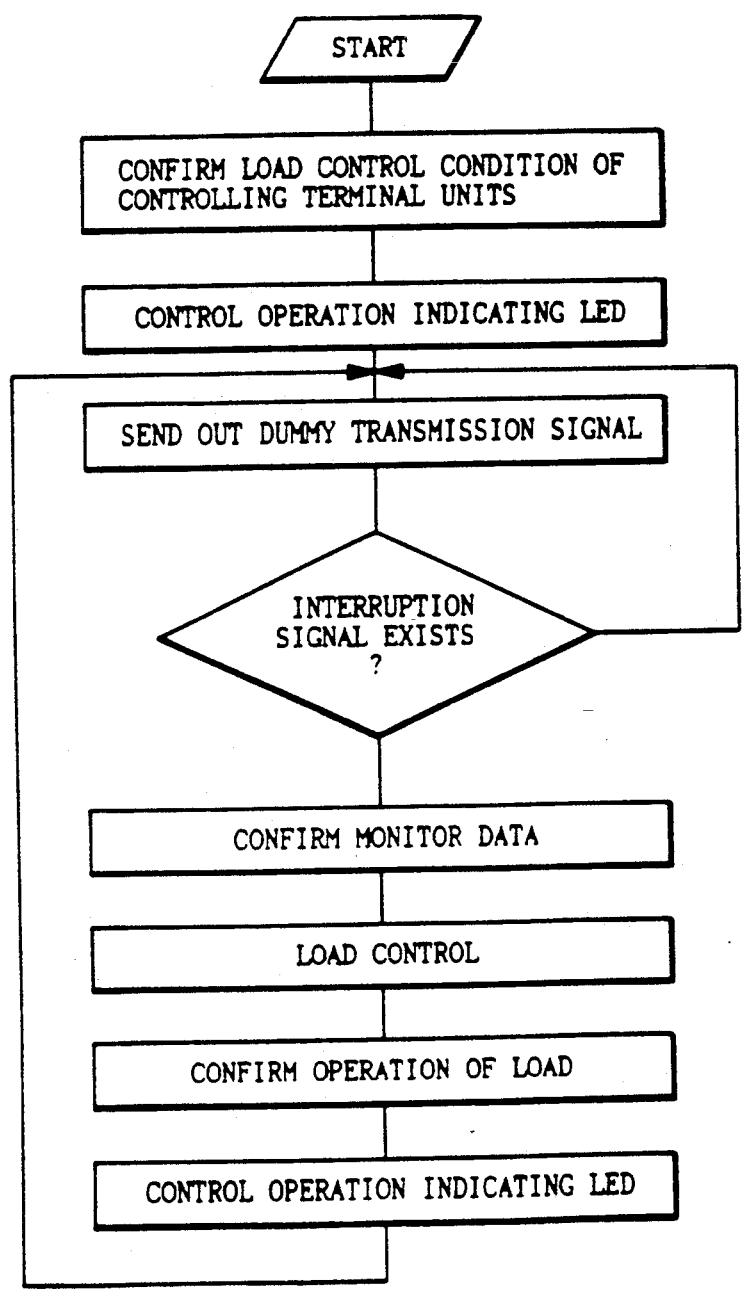
Figure 8:
Figure 8:
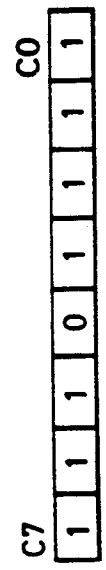

FIG. 7A shows the interrupt processing operation in which the central control unit 1 always sends out the dummy transmission signal $V_{S0}$ so as to check the presence of the interrupt request signal Vi from the monitor terminal units 2. When the monitor input of one of the monitor terminal units 2 changes, a predetermined bit of the input latch is set to "1" in response to the change of the monitor input, and then the interrupt request signal Vi is sent out from the monitor terminal unit 2 in synchronism with the start pulse signal ST of the dummy transmission signal $V_{S0}$. The central control unit 1 which has received the interrupt request signal Vi then carries out an interrupt operation to send an address-confirmation mode transmission signal Vs1 to thereby specify the interrupt requesting terminal unit 2. The address-confirmation mode transmission signal Vs1 includes an eight-bit address data signal, the upper four bits of which are used to make access collectively to 16 monitor terminal units 2 and the lower four bits of which are to be returned from the interrupt requesting terminal unit 2 in its return wait period. In response to the return of the lower four bits of the specific address from the interrupt requesting terminal unit 2, the central control unit 1 synthesizes the eight-bit specific address of the interrupt request terminal unit 2 from the upper four bits and the lower four bits returned from the terminal unit, so that an interrupt-access mode transmission signal $Vs_2$ having the specific address as an address data is sent out to access the interruptrequesting terminal unit 2. As a result, bit data R0 to R7 representing the change of monitor input, as shown in diagram (a) of FIG. 8, are returned from the interrupt requesting terminal unit 2, so that the central control unit 1 can confirm the change of the bits. Succeedingly, the central control unit 1 sends an ON-OFF confirmation mode transmission signal $Vs_3$ for judging whether the bit data is set to the ON state or to the OFF state, so that data indicating the current state of the monitor input is returned from the interrupt requesting terminal unit 2. Succeedingly, the central control unit 1, having received this data, sends a reset mode transmission signal $VS_4$ to reset the input latch of the interrupt requesting terminal unit 2 to thereby make the next monitor input acceptable. In this embodiment, control data C0 to C7 (complementing to the bit data R0 to R7) as shown in diagram (b) of FIG. 8 are transmitted for resetting predetermined bits of the input latch in response to the reset mode transmission signal $Vs_4$. Further, bit data are returned from the interrupt requesting terminal unit 2 after resetting of the input latch. The central control circuit 1 detects the resetting of the input latch from the return of the bit data, and, upon confirmation, stops the monitor input latching operation in the aforementioned interrupt processing, whereafter an operation for controlling loads on the basis of the returned data is carried out. FIG. 7B is a flowchart showing the monitoring and controlling operations of the central control unit 1.

Figure 9:
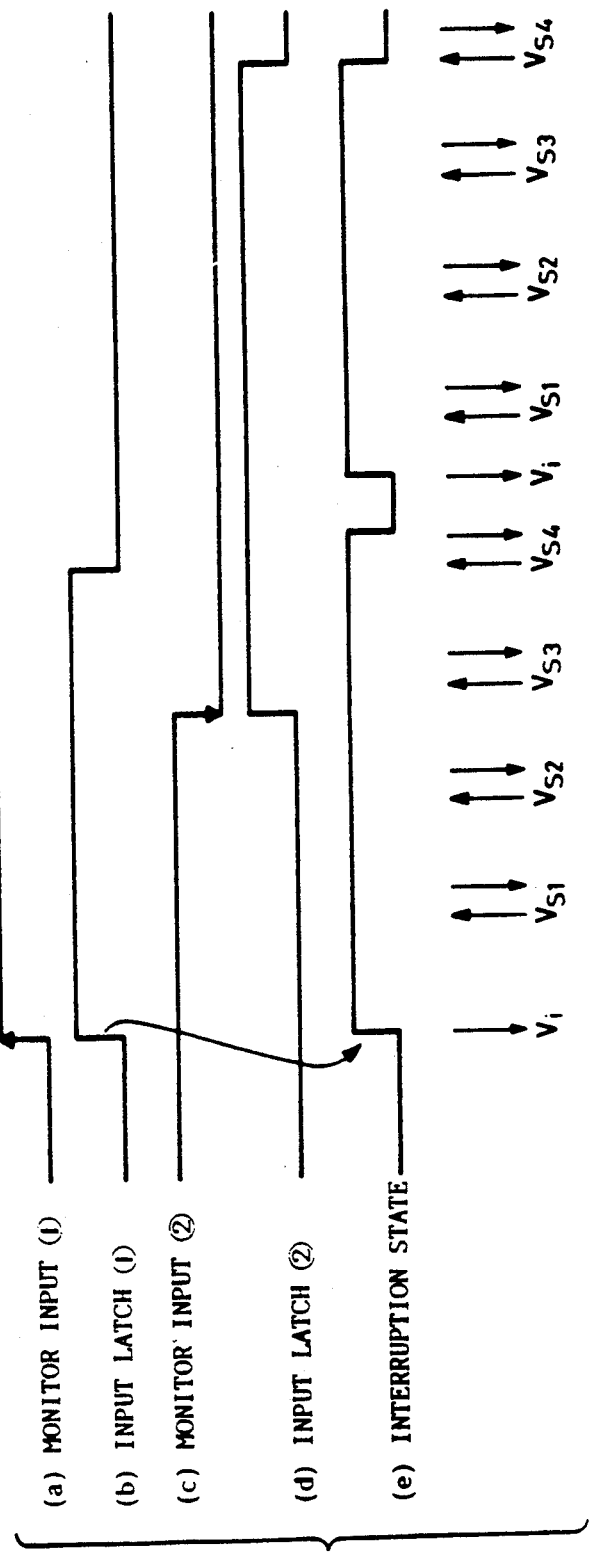

As shown in FIG. 9, while the aforementioned interrupt processing is carried out upon the setting of predetermined bits of the input latch 1 to "1" corresponding to the change of the monitor input 1 of a first monitor terminal unit 2, if the monitor input 2 of a second monitor terminal unit 2 having the same address as that of the first terminal unit 2 changes, predetermined bits of the input latch 2 of the second terminal unit 2 change to "1", to thereby set the interrupt request signal to the operational state. However, the operational state of the interrupt request signal is not established during interrupt processing due to the change of the monitor input 1.

In this embodiment, when interrupt processing due to the change of the monitor input 1 is completed, the resetting of the input latches 1 and 2 starts bit by bit. Accordingly, because the specified bits of the input latch 2 of the second monitor terminal unit 2 are never reset by the reset mode transmission signal $Vs_4$ sent out after interrupt processing is completed with respect to the first monitor terminal unit 2, the interrupt request signal Vi is continuously generated by the second monitor terminal unit 2. In short, immediately after the signal returning operation for reporting the change of the monitor input 1 due to the interrupt request of the first monitor terminal unit 2 is completed, the central control unit 1 receives the interrupt request from the second monitor terminal unit 2, whereby the signal returning operation for reporting the change of the monitor input 2 is carried out by interrupt processing as described above. Accordingly, the interrupt processing operation is made continuous. Even if the monitor input signals 1 and 2 of the same address change substantially simultaneously, the change of the monitor input 2 is not ignored, and hence operational errors caused by ignoring such an input are prevented.

Figure 10:
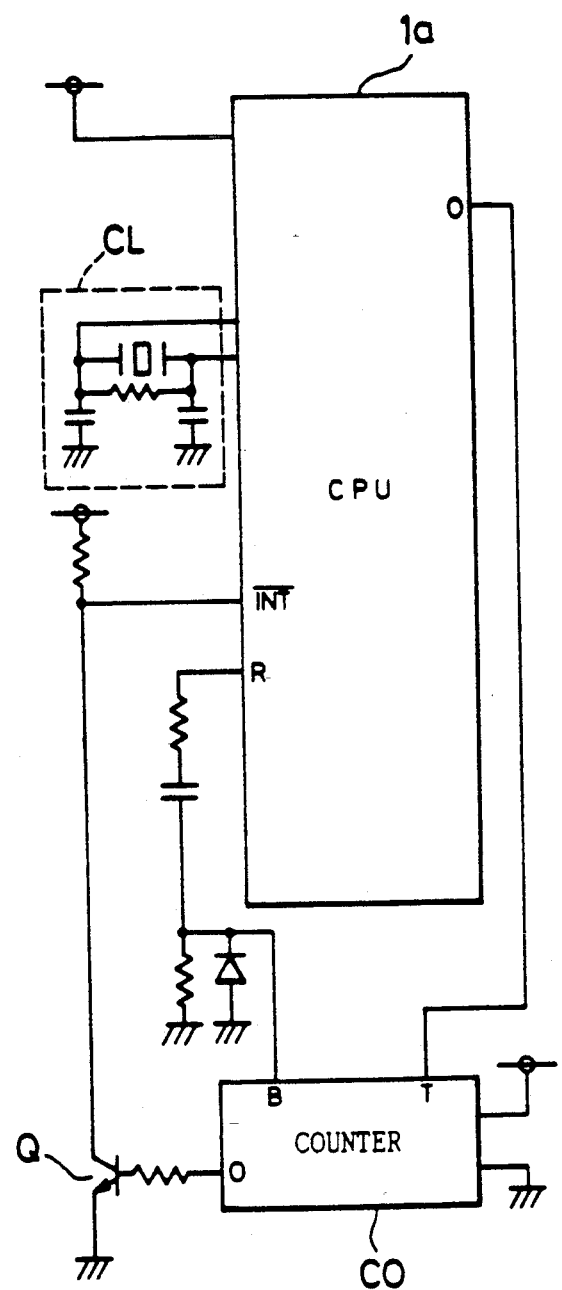
FIG. 10 is a circuit diagram of a misoperation preventing circuit used in the FIG. 1 embodiment.

FIG. 10 shows a circuit for preventing misoperations due to failure of a CPU 1a constituting the computing section of the central control unit 1.

The CPU 1a performs various computing operations for time-divisional multiplex transmission on the basis of a clock signal generated by a clock generating circuit CL, so that, whenever the transmission signal Vs is sent out, the reset pulse of a counter CO and the frequency-divided time clock are applied to an R terminal and a $\phi$ terminal, respectively. The count-up output of the counter CO, which counts up the time clock and is reset by the reset pulse, is applied to an INT terminal (an input terminal provided for an initial signal, having a low active state, for initializing the operational program), through a transistor Q. When time-division multiplex transmission is carried out normally, the period of the reset pulse is set shorter than the period between the resetting of the counter CO and the time the maximum count-up output is reached, so that no initial signal is generated during the normal operation. When the CPU 1a malfunctions for some reason, namely, when the reset pulse cannot be generated, however, a count-up signal as an initial signal is applied to the INT terminal at the same time the counter CO counts up, so that the operational program of the CPU 1a is initialized to return the operation to the normal state.

A wireless system employing optical communication according to the present invention will now be described.

Figure 11:
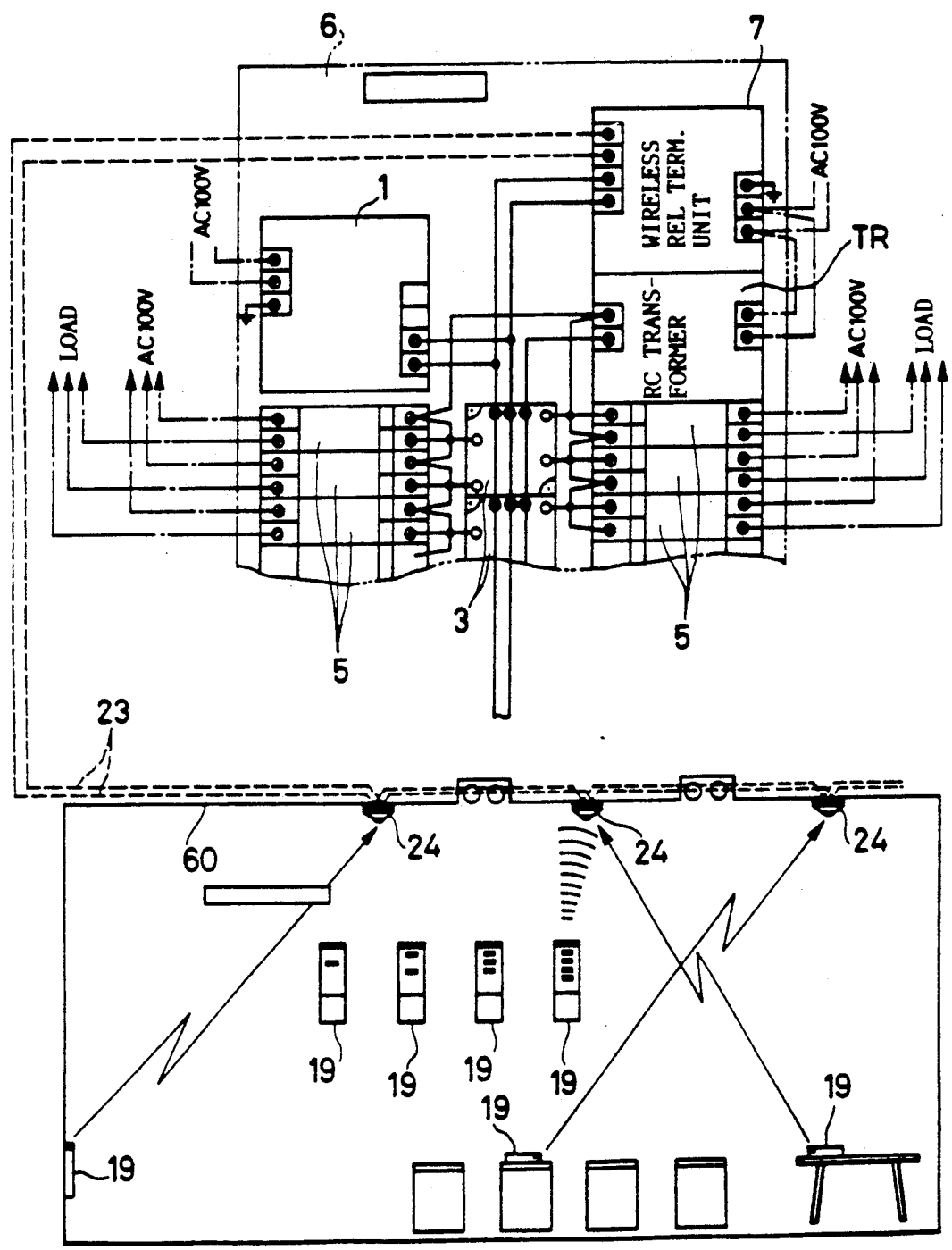
FIG. 11 shows the general arrangement of a wireless system used in the FIG. 1 embodiment.
Figure 13:
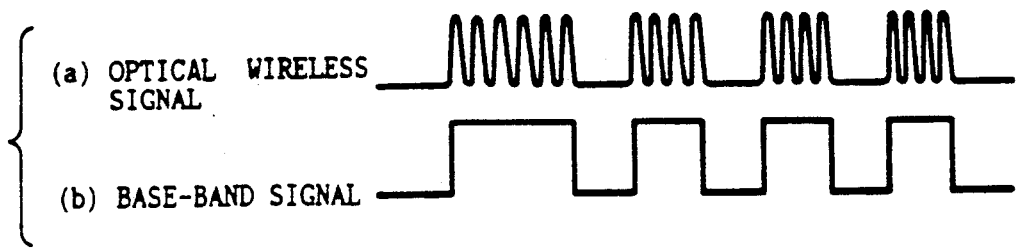
FIGS. 13 and 14 show formats of various signals in the wireless system.
Figure 14:
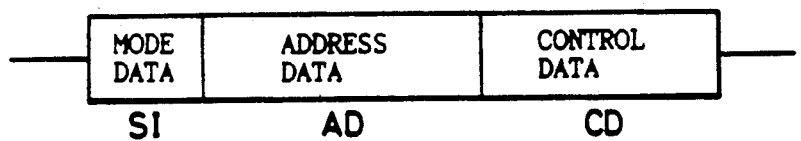

FIG. 11 schematically shows the general arrangement of the wireless system, in which wireless transmitters 19 for transmitting optical wireless signals are classified into two types as shown in FIG. 11, that is, a wall style and a desk style. A plurality of wireless receivers 24 for receiving optical transmission codes from the wireless transmitters 19 are mounted on a ceiling 60. The wireless transmitters 19, each having a specific address, are arranged to be controlled by the central control unit 1 in the same manner as the monitor terminal units 2. For example, a transmission code for ON-OFF control of lighting equipment is transmitted as an optical wireless signal, as shown in diagram (a) of FIG. 13. Accordingly, the layout of the lighting equipment can be easily modified without greatly changing the overall system. The transmission code of the optical wireless signal includes address data AD and control data CD, as shown in FIG. 14. Mode data SI in the front of the address data AD is provided for selection between whether the wireless system is to be operated together with other systems, such as remote control units using time-division multiplex transmission, or whether the wireless system is to be operated separately.

Figure 16:
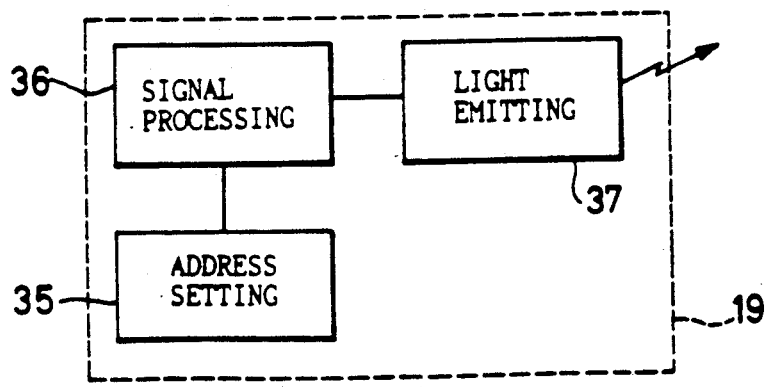
Figure 17:
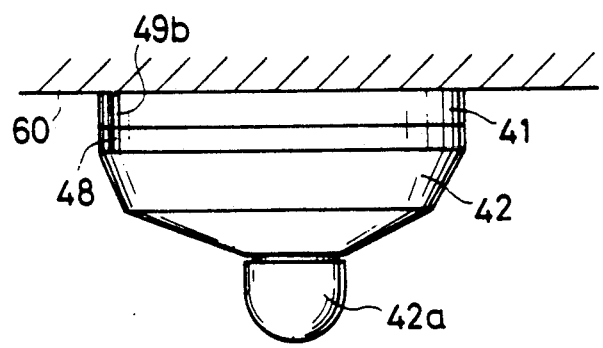
FIG. 17 is a front view of a wireless receiver.
Figure 18:
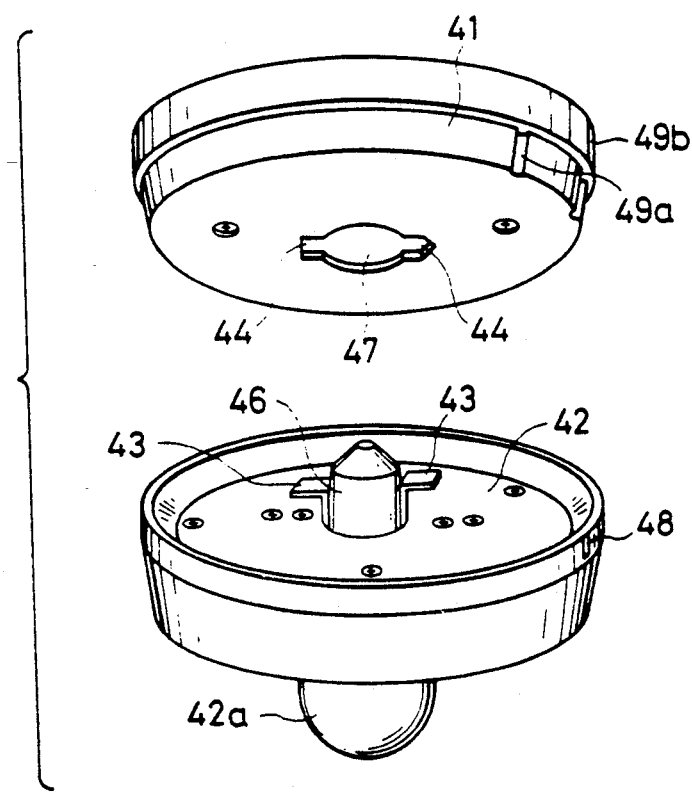
FIG. 18 is an exploded perspective view of a wireless receiver.
Figure 19:
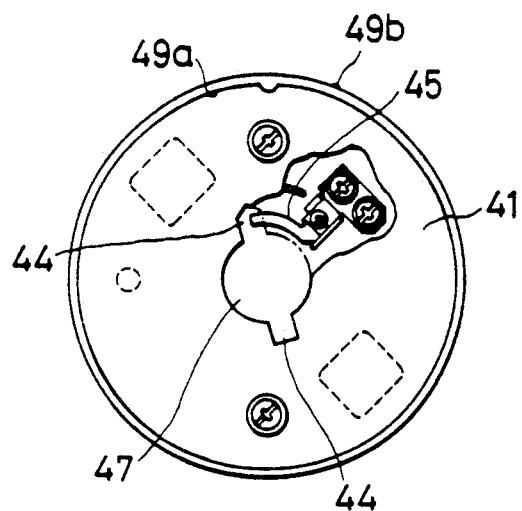
FIG. 19 is a partly cutaway front view of a wireless receiver.
Figure 20:
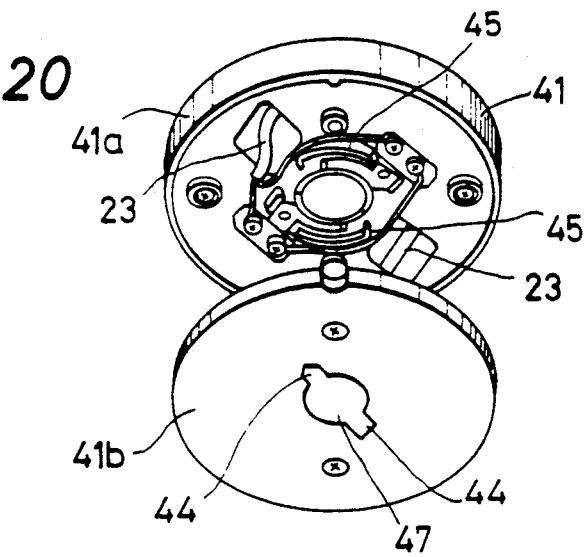
FIG. 20 is another exploded perspective view of a wireless receiver.
Figure 21:
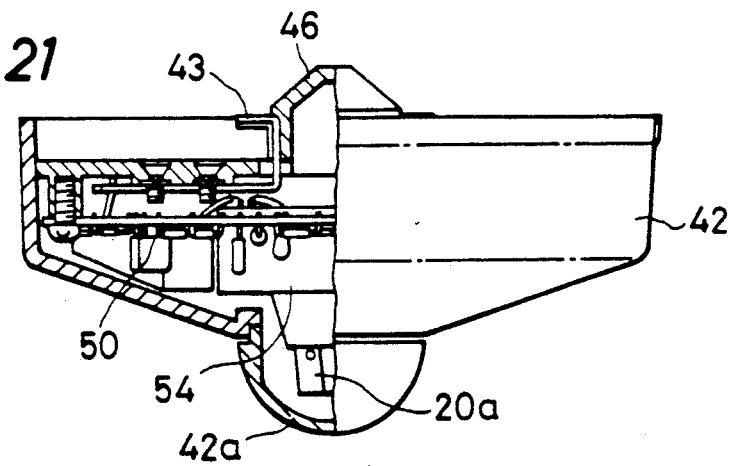
FIG. 21 is a partly cutaway side view of a wireless receiver.
Figure 22:
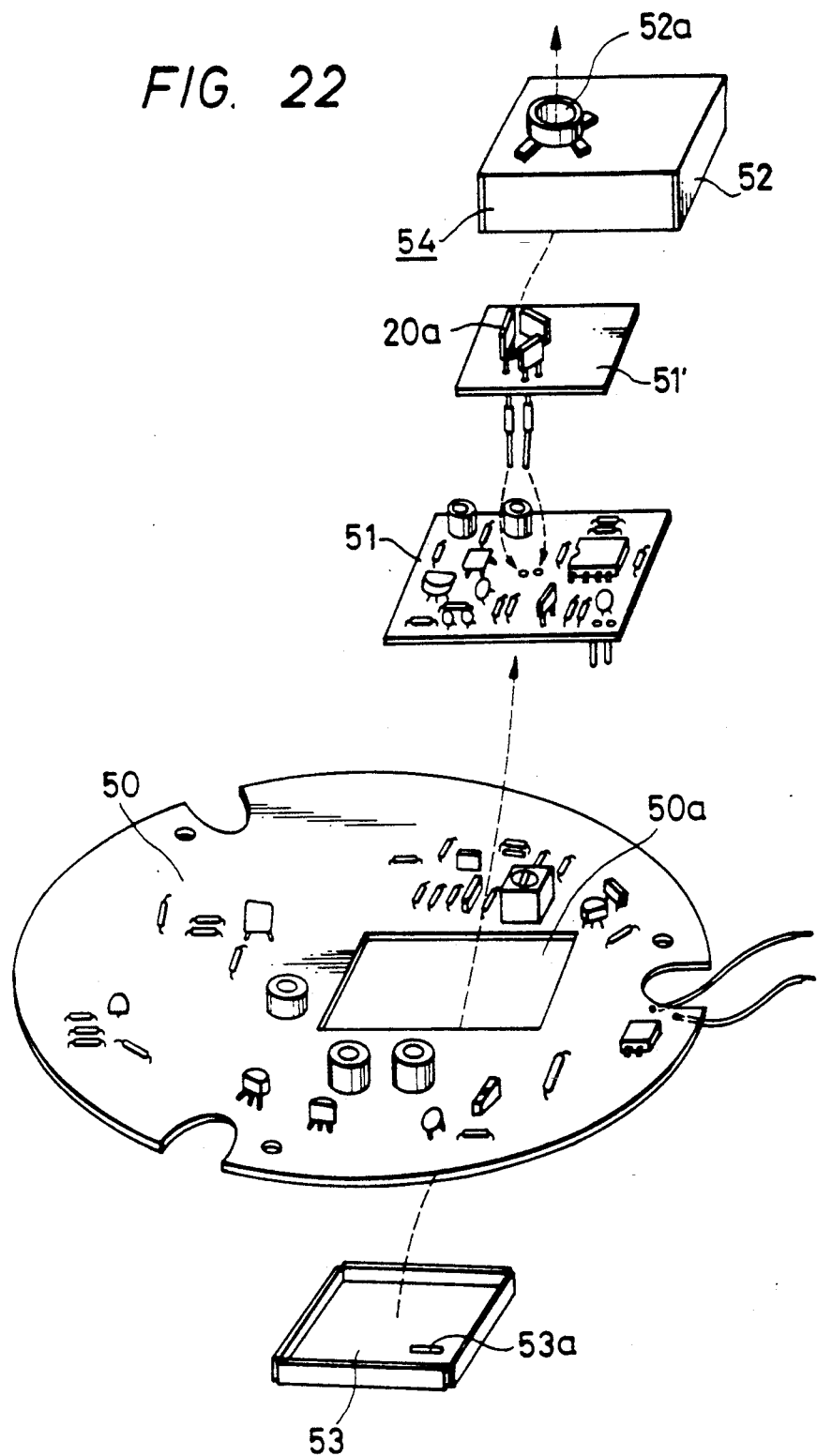
FIG. 22 is yet another exploded perspective view of a wireless receiver.

FIG. 16 shows a specific example of the circuit arrangement of one of the wireless transmitters 19. The circuit includes an address setting section 35 for setting the address, a signal processing section 36 for generating the transmission code, and a light-emitting section 37 including a light-emitting diode for transmitting the transmission code as an optical wireless signal.

Figure 12:
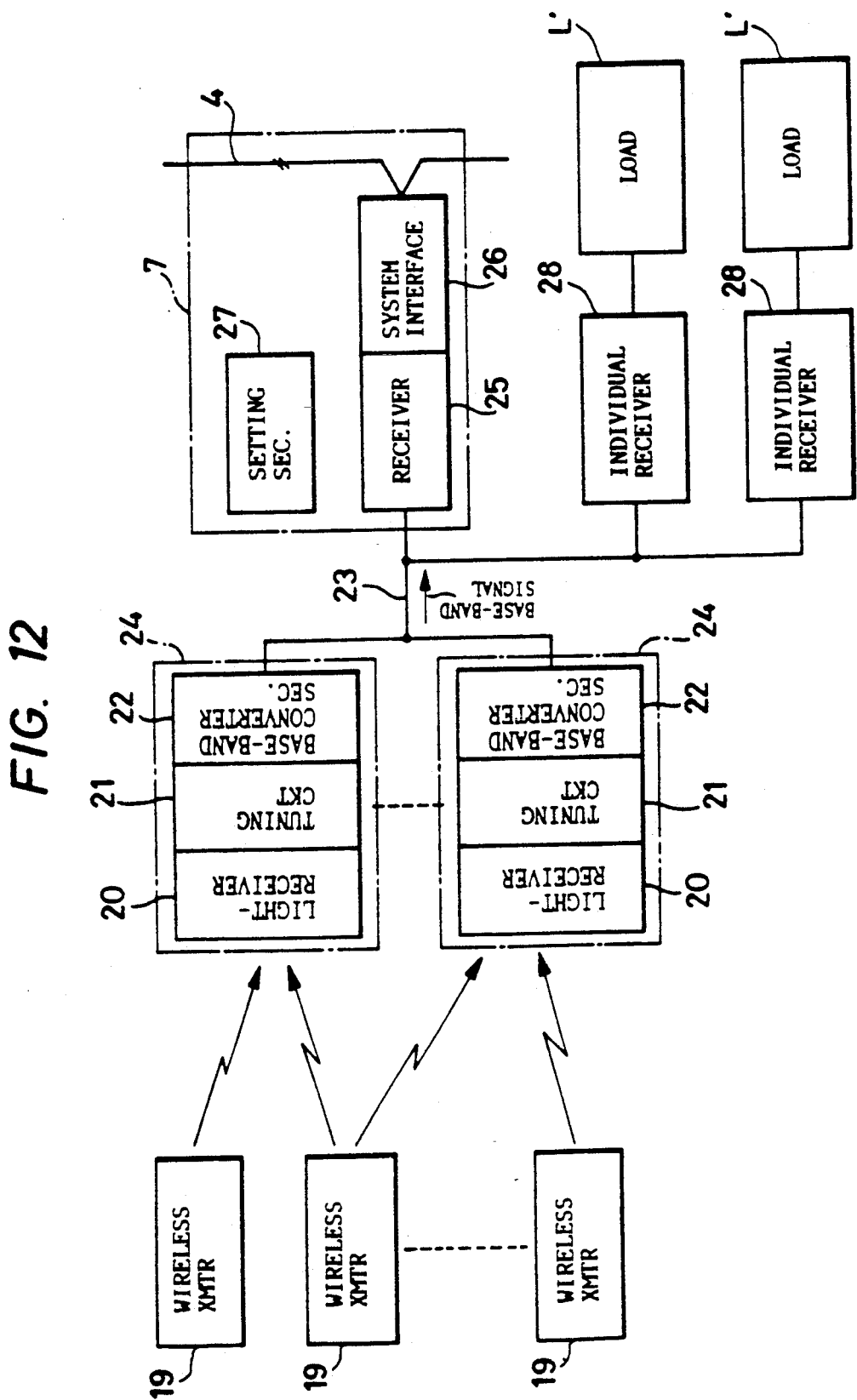
FIG. 12 shows the circuit arrangements of wireless receivers.

As shown in FIG. 12, each of the wireless receivers 24 for receiving the optical wireless signal is constituted by a light-detecting section 20, a tuning circuit 21, and baseband converting section 22. The light-detecting section 20 includes a photosensor 20a constituted by a photodiode for detecting the optical wireless signal received from the wireless transmitters 19. The tuning circuit 21 has a tuning function for detecting a carrier wave of the output of the tuning circuit 21 into a baseband signal, as shown in diagram (b) of FIG. 13. The baseband signal from the wireless receiver 24 is applied onto an exclusive-use signal line 23 to transmit the signal to a wireless relay terminal unit 7 and a plurality of individual receivers 28 connected to the signal line 23.

Figure 15:
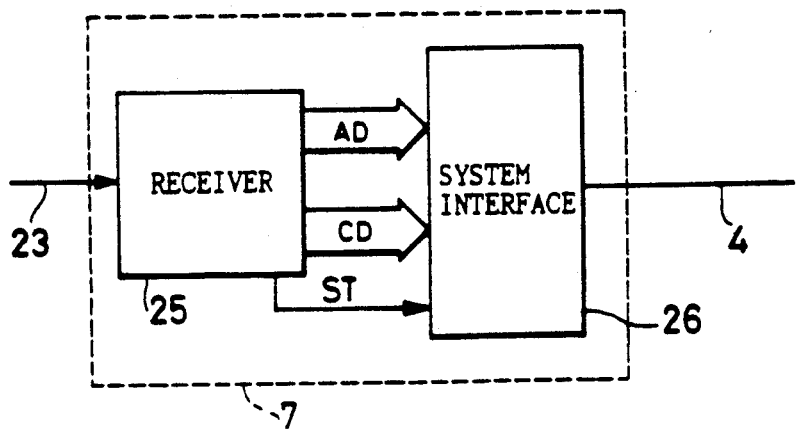
FIGS. 15 and 16 are circuit diagrams of other parts of the wireless system.

The wireless relay terminal unit 7, functioning as a wireless interface section, receives collectively the baseband signals from each of the wireless receivers 24. As shown in FIG. 15, the wireless relay terminal unit 7 is constituted by a receiving section 25 for receiving the baseband signal, a setting section 27 for selecting whether the wireless system is to be operated together with other systems or whether the wireless system is to be operated separately, a system interface 26 for receiving address and control data from a parallel binary signal obtained by converting the baseband signal in the receiving section 25, and related components. The system interface 26 is connected to the signal line 4 in the multiplex transmission control system to thereby be processed by the central control unit 1. Only a signal format set in the receiving section 25 of the wireless relay terminal unit 7 is extracted from the baseband signal to judge whether the operation is a systematic one or an individual one in the setting section 27. The received address and control data are sent to the system interface 26 from the receiving section 25.

Each of the individual receivers 28 is constituted by a receiving section for receiving the baseband signal from the wireless receivers 24, an address setting section for setting the specific address, a load interface for driving a load control relay or the like in accordance with control data, and other related components. The individual receiver 28 compares the baseband signal with the set address thereof, and if there is coincidence between the baseband signal and the set address, the individual receiver drives the load control relay or the like via the load interface to thereby control a load L', for example, a lighting device.

Thus, the optical wireless signal transmitted from one of the wireless transmitters 19 is received by the nearest one of the wireless receivers 24. In the wireless receiver 24, only a signal of a frequency determined by the tuning circuit 21 is detected and converted into a baseband signal by the baseband converting section 22, and the baseband signal is transmitted to the wireless relay terminal unit 7 and the individual receivers 28 through the signal line 23. When the mode data SI of the transmission code indicates selection of an individual operation, the wireless relay terminal unit 7 makes no response because the target of transmission is among the individual receivers 28. The address of the baseband signal is compared with the preset addresses of the individual receivers 28, and if there is coincidence therebetween, controlling of the load is carried out in accordance with the control data. Otherwise, when the mode data SI of the optical wireless signal from the wireless transmitter 19 indicates selection of systematic operation, the wireless relay terminal unit 7 makes a response. That is, the address and control data with which the baseband signal has been converted into a binary parallel signal are put into the system interface 26 where data-return processing is carried out according to a predetermined procedure in the central control unit 1.

As shown in FIGS. 17 through 22, each of the wireless receivers 24 is constituted by a receiver base 41 provided with wiring for the signal line 23 and mounted on the ceiling 60, and a detection head 42 fitted to and attached to the receiver base 41. The detection head 42 is provided therein with an optical sensor 20a constituted by a photodiode, and a signal processing circuit constituted by a light detecting section 20, a tuning circuit 21 and a baseband converting section 22. A pair of reverse L-shaped hook-like stoppers 43 projecting from the upper surface of the detection head 42 are arranged so as to be fitted or connected to a pair of hooking-connection terminals 45 within the receiver base 41 by turning horizontally the detection head 42 while the pair of hook-like stoppers 43 are inserted into a pair of stopper-insertion notches 44 formed in the lower surface of the receiver base 41. In this embodiment, a guide projection 46 and an insertion hole 47 for the guide projection 46 are provided in the center of the lower surface of the receiver base 41, respectively, so that the hook-like stoppers 43 and the stopper-insertion notches 44 for insertion of the hook-like stoppers 43 are provided around the guide projection 46 and around the insertion hole 47. A linear marker 48 formed on the detection head 42 corresponds to markers 49a and 49b of the receiver base 41 to make it easy to mount the detection head 42 onto the receiver base 41. When the marker 48 coincides with the marker 49a, the hook-like stoppers 43 are aligned with the respective stopper-insertion notches 44, and when the marker 48 coincides with marker 49b, the hook-like stoppers 43 are set so as to be securely connected to the respective hook-connection terminals 45. In this embodiment, the stopper-insertion notches 44 differ from each other in shape, and a triangular section is formed in the top of one of the hook-like stoppers 43 so as to be applicable to the case where proper connection polarity is required. Further, in this embodiment, the stopper-insertion notches 44 are formed so as to be united with the guide hole 47.

A printed circuit board 50 having as a main circuit a signal processing circuit has an opening 50a formed in its center section. Circuit parts easily affected by noise, such as the circuit of the light-detecting section 20 having a preamplifier for amplifying a feeble signal generated by the photosensor 20a, are mounted on a second printed circuit board 51 and housed in a shielded case 54 constituted by a shield case body 52 having a window 52a for the photosensor 20a and a cover 53 having an insertion hole for lead wire. The shield case 54 is arranged in the center opening 50a. In this embodiment, the photosensor 20a is mounted on the second printed circuit board 51 through a third printed circuit board 511.

Figure 23:
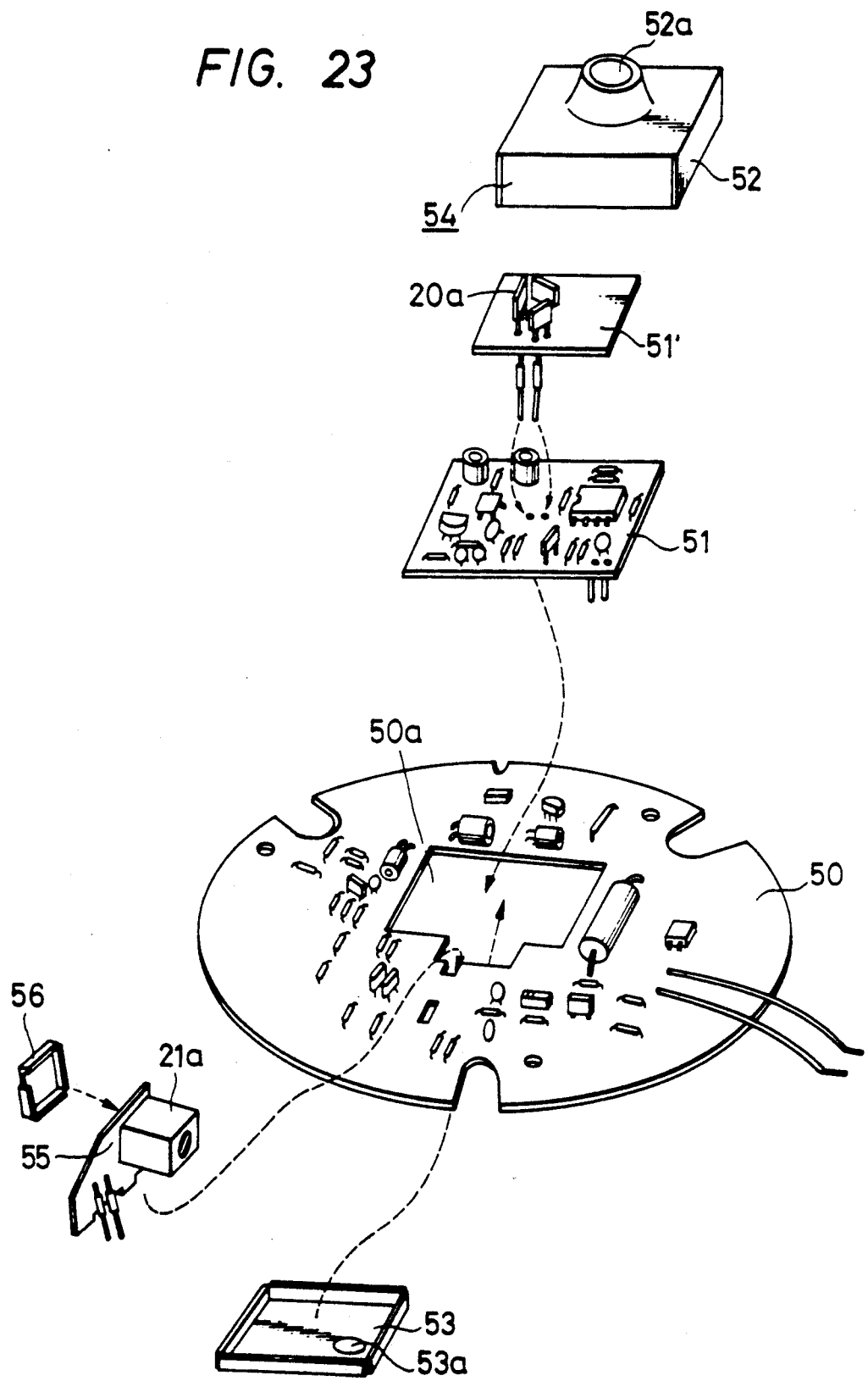
FIG. 23 is an exploded perspective view showing another embodiment according to the present invention.

FIG. 23 shows another arrangement of the printed circuit boards. In FIG. 23, an auxiliary printed circuit board 55 is provided so that a tuning coil 21a of the tuning circuit 21 can be mounted thereto while it is in an inclined position. In the case where the width of the coil 21a is less than the height thereof, the thickness of the signal processing section composed of parts mounted on the printed circuit board 50 be made relatively thin compared with the case where the coil 21a is mounted upright, and hence the detection head 42 can be reduced in thickness.

Figure 24:
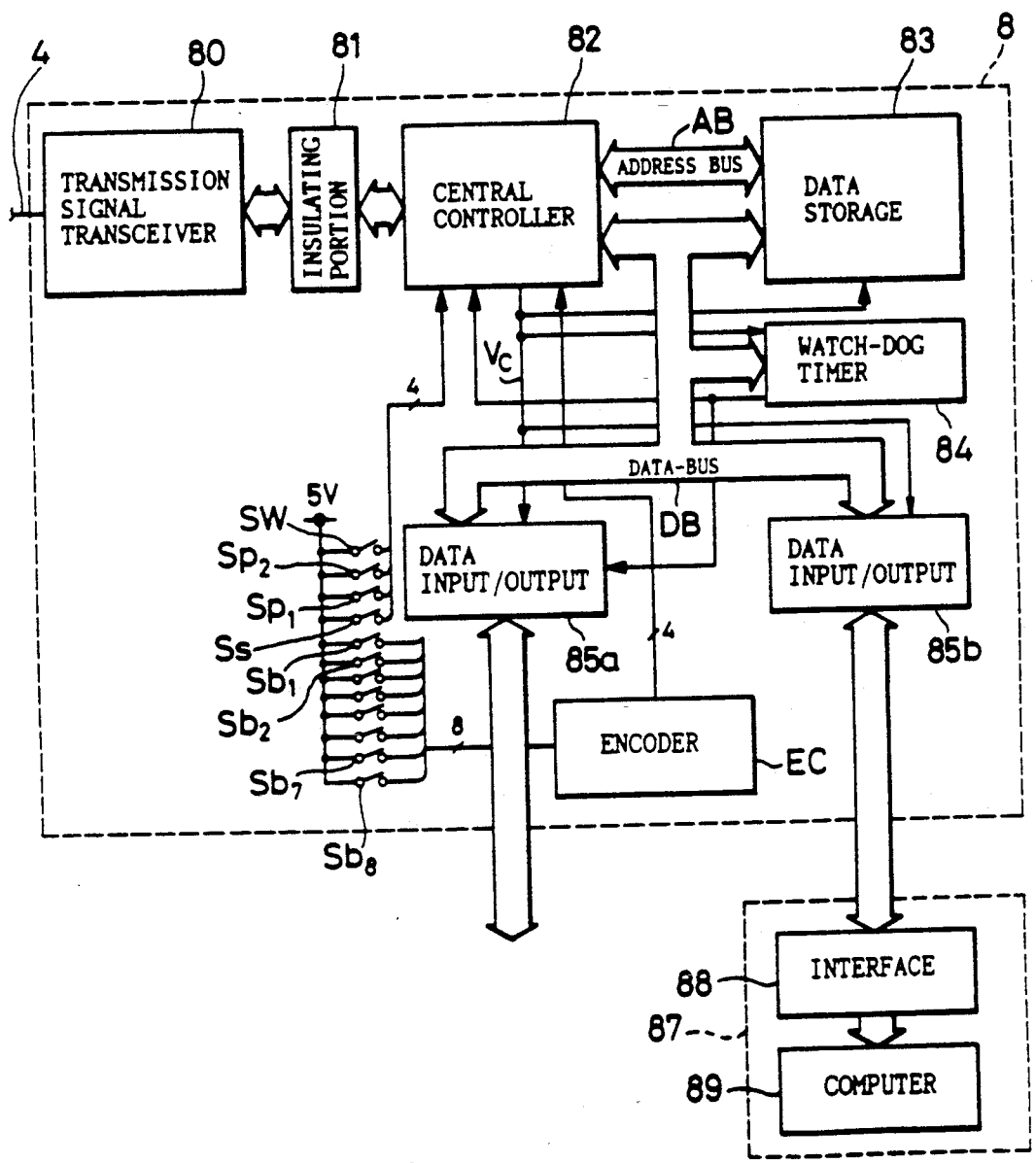
FIG. 24 is a block circuit diagram of the main part of the FIG. 23 embodiment.

FIG. 24 shows the arrangement of an external interface terminal unit 8 according to the present invention, in which time-division multiplex transmission of data is realized between the central control unit 1 and an external control unit 87, such as a host computer. The external interface terminal unit 8 is constituted by a transmission signal transmitting/receiving section 80 for transmitting/receiving a time-division multiplex signal through the signal line 4, an insulating section 81 functioning as a photocoupler for signal transmission in an electrically insulated state, a central control section 82 for performing signal processing and judgement, a data storage section 83 for storing the operation state of the remote supervisory and -controlling system, a watchdog timer 84 for resetting the CPU to "unhang" the central control section 82 when necessary, and data input-output sections 85a and 85b. The data I/O section 85a is provided for input and output of bit-serial data, and the data I/O section 85b is provided for input and output of bit-parallel data. In this embodiment, the central control section 82 is provided with a condition setting unit for suitably changing transmission conditions, such as the baud rate, number of stop bits and the like, of the bit-serial data (in this embodiment, RS232C specification) transmitted through the data I/O section 85a, and a transmission error checking unit for performing parity checking of the data transmitted through the data I/O section 85a. The setting of transmission conditions is made by baud rate setting switches $Sb_1$ to $Sb_8$, a stop-bit setting switch Ss, parity setting switches $Sp_1$ and $SP_2$, and a word length setting switch Sw. The operational states of the switches $Sb_1$ to $Sb_8$ for setting the baud rate in eight steps is fetched to the central control section 82 through an encoder EC.

The operation of the external interface terminal unit 8 will now be described.

It is now assumed that a computer body 89 of an external control unit 87 is connected to one of the data I/O sections 85a and 85b of the external interface terminal unit 8 through an interface 88 in order to carry out data transmission between the external control unit 87 and the external interface terminal unit 8. The transmission signal transmitting/receiving section 80 of the external interface terminal unit 8 receives a transmission signal Vs transmitted through the signal line 4. The central control section 82 of the external interface terminal unit 8 continuously monitors the data included in the transmission signal Vs and discriminates the load operational state, the pattern control state, and the like, and accordingly stores a load control state data in the data storage section 83. When a state-confirmation command for confirmation of the operational state of the remote supervisory and control system is sent out from the external control unit 87, the central control section 82 of the external interface terminal unit 8 decodes the command so that the state data, such as a load control state, a pattern control state and the like, stored in the data storage section 83 are returned to the external control unit 87.

On the other hand, when a load control command for switching the loads of the remote supervisory and controlling system to individual operation or pattern control operation is sent out from the external control unit 99, the central control section 82 of the external interface terminal unit 8 decodes the command and carries out the same operations as the monitor terminal unit 2 of the remote supervisory and controlling system, so that a return signal including monitor data is transmitted onto the signal line 4 from the transmission signal transmitting/receiving section 80 in the same manner as in the case where one of the individual operation switches or pattern control switches is pushed. Because both the specific address and the monitor data relating to the operational states of the switchers are set according to the control command so that the external interface terminal unit 8 can carry out the same operations as the monitor terminal unit 2, the same load controlling operation as in the case where one of the monitored switches in the remote supervisory and controlling system is pushed is effected, thus carrying out a pseudo switching operation in the external control unit 87.

Accordingly, the remote supervisory and controlling system can be easily interlocked with the external control unit 87 by the external interface terminal unit 8. Further, operations such as a local controlling operation, a timer operation, a patterning operation, and the like for controlling a plurality of systems with the external control unit 87 functioning as a higher-ranking control system can easily be carried out. Further, the setting of the control pattern for collectively controlling the loads can be changed by sending a pattern setting command from the external control unit 87 to the external interface terminal unit 8, and confirmation of the set pattern can be made by sending a setting-confirmation command.

Furthermore, when a change of the operational state of the loads is recognized by the external interface terminal unit 8, an interrupt signal may be sent from the external interface terminal unit 8 to the external control unit 87 to effect the transmission of data indicative of the load change. Hence, the operational states of the loads can be always monitored by the external control unit.

Either bit-serial data or bit-parallel type data can be used as the input-output data in the external interface terminal unit 8, and hence transmission of data between the external interface terminal unit 8 and the external control unit 87 can be easily carried out without the use of another, converting-type interface.

In this embodiment, as described above, there is provided a condition setting unit for suitably changing the transmission conditions, such as the baud rate (75 bits per second, 150 bits per second, 300 bits per second, 600 bits per second, 1200 bits per second, 2400 bits per second, 4800 bits per second, or 9600 bits per second), the number of stops bits (one bit or two bits), the parity (none, even, or odd), the word length (eight bits or seven bits) and the like, by the switches $Sb_1$–$Sb_8$, Ss, $SP_1$, $SP_2$ and Sw. Accordingly, the present invention is applicable to various types of bit-serial data as long as the aforementioned conditions can be set by the switches $Sb_1$–$Sb_8$, Ss, $SP_1$, $SP_2$ and Sw. Particularly, in this embodiment, data to be used in the data processing operations of the central control section 82 can be changed over from bit-serial type data to bit-parallel type data when all of the baud rate setting switches $Sb_1$–$S_8$ are turned off. In this case, the baud rate setting switches are used for the data processing bit-parallel data.

Furthermore, in this embodiment, there is provided a transmission error checking unit for checking transmission errors in the input data by a parity checking operation, so that the system is substantially free from operating errors caused by transmission errors. When bit-parallel type data are used, not only can the input and output of a great amount of data be carried out at high speed, but also the input and output of data can be carried out with an apparatus having a simple data processing circuit.

Figure 25:
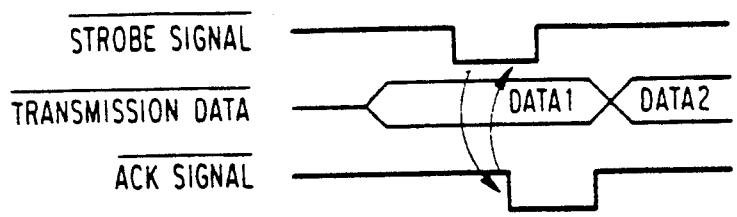
FIG. 25 is a timing chart of signals in the FIG. 23 embodiment.

FIG. 25 provides a timing chart for the case where input and output of bit-parallel type data is carried out using a handshake operation between the external control unit 87 and the data I/O section 85b of the external interface terminal unit 8. For example, in the transmission of data from the external control unit 87, the level of a strobe signal is set to "L" by the external control unit 87 at the point of time when the transmission data of the external control unit 87 has been completed. The data I/O section 85b receives the transmission data from the external control unit 87 in response to the "L" level of the strobe signal. At the point of time when the reception of the data has been completed, the level of the ACK signal returns to "L" to thereby set the level of the strobe signal to "L" to thus place the data I/O section 85b in the standby state. Data transmission from the data I/O section 85b to the external control unit 87 is carried out using the same handshake operation as described above.

Figure 26:
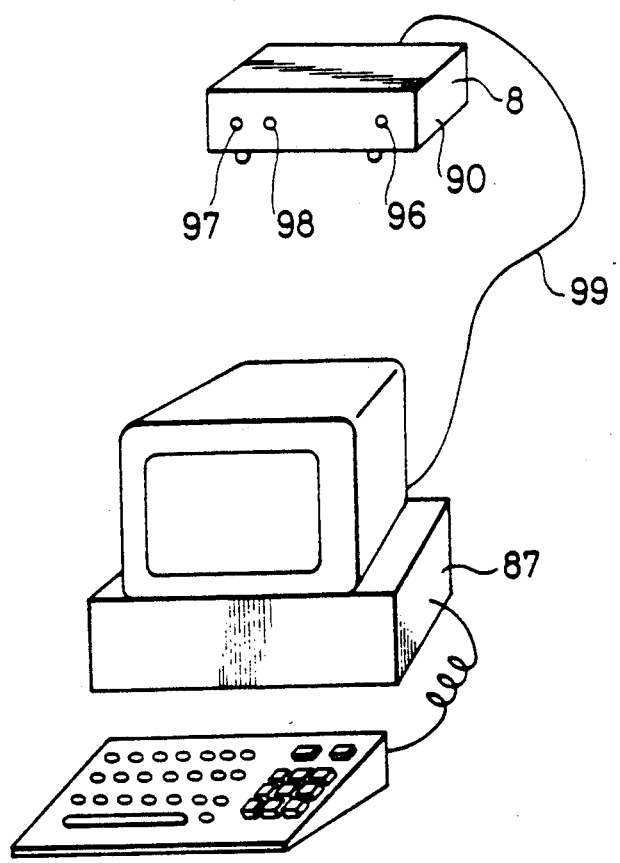
FIG. 26 shows the external appearance of an external interface unit.
Figure 27A:
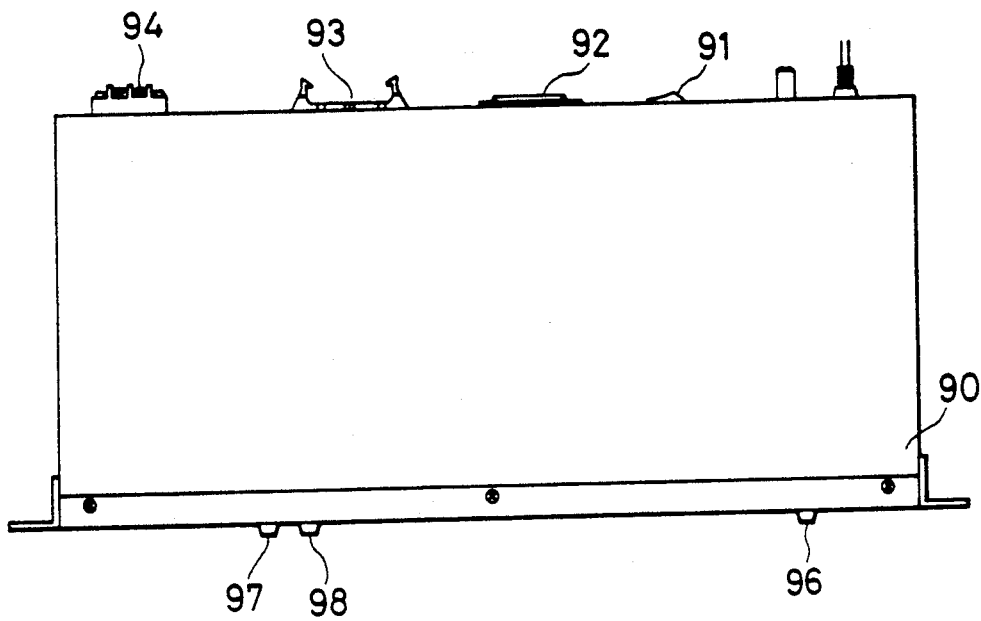
FIGS. 27A, 27B, and 27C are a plan view, a front view, and a rear view of a main part of the FIG. 23 embodiment.
Figure 27B:
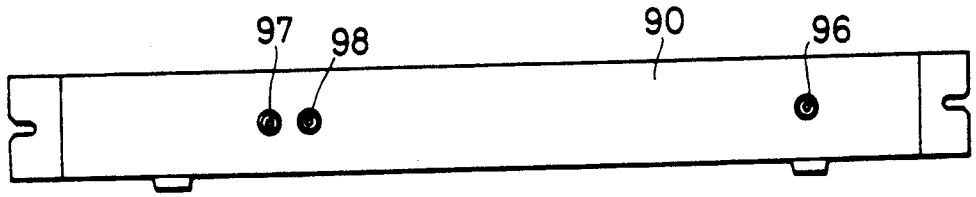
Figure 27C:
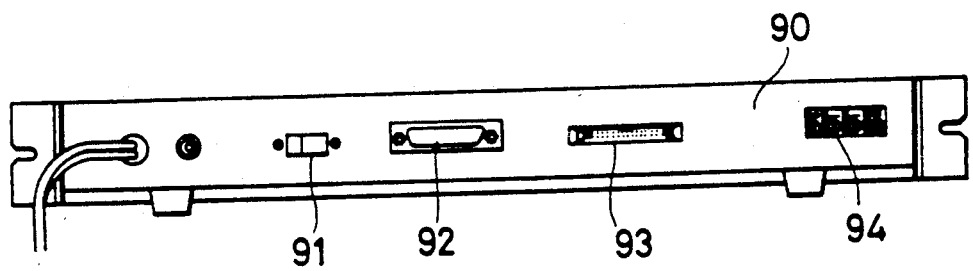

FIGS. 26 and 27 show the external appearance of the external interface unit 8. A power switch 91, a bit-serial data (RS232C) connector 92, a bit-parallel data connector 93, and a connection terminal 94 for the time-divisional multiplex transmission signal line 4 are provided on the rear panel of the case 90. A power supply indicator lamp 96, a transmission signal reception indicator lamp 97, and a data signal reception indicator lamp 98 are provided on the front panel of the case 90. The external control unit 87 is constituted by a body 87a, a keyboard 87b, and a display unit 87c. In this embodiment, the external control unit 87 is connected to the external interface terminal unit 8 through an RS232C cable 99. The external interface terminal unit 8 may be incorporated in the external control unit 87 in the form of an interface board. Further, the external interface terminal unit 8 may be formed as a monitor-only type unit or a control-only type unit.

FIG. 28 shows another embodiment, in which the external interface terminal unit 8 serves as a terminal unit for a plurality of remote supervisory and controlling systems $X_l$ to $X_n$, so that time-division multiplex transmission of data can be carried out between the external control unit 87 and the central control unit 1 in each of the remote supervisory and controlling systems $X_l$ to $X_n$. As a result, a large-scale system can be constructed easily.

Figure 29:
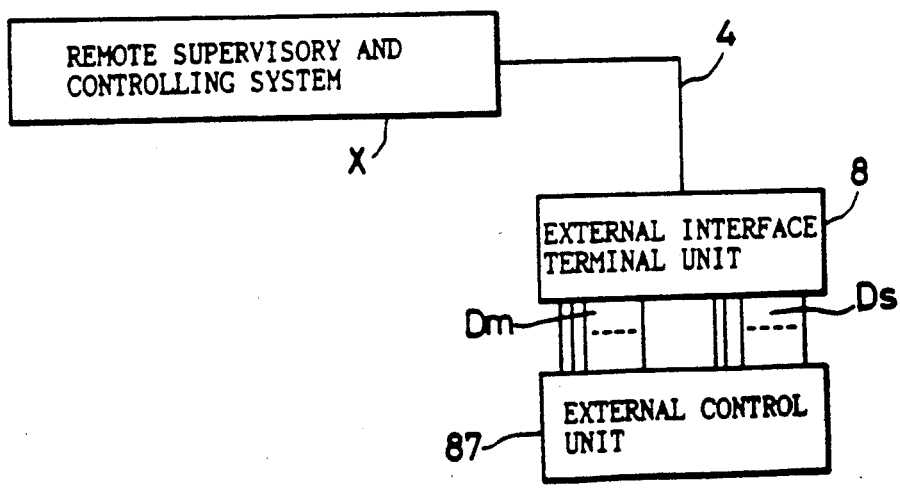

FIG. 29 shows a further embodiment, in which an input-output port for n-bit type mode data Dn and an input-output port for m-bit type transmission data Ds are provided as data input-output ports in the external interface terminal unit 8, so that the data transfer can be carried out directly without the use of another, more complex data transmission method. As a result, the monitor and control of the loads can be effected with the use of the external control unit 8 including a simple digital circuit without the use of expensive equipment such as a computer or the like.

FIG. 30 shows a still further embodiment, in which mode data Dm and transmission data Ds composed of eight bits (two hexadecimal bytes) are used as channel data (corresponding to the address data) and data for selection of a load to be controlled.

FIG. 31 is a block diagram of a pattern setting terminal unit 9 having a data input-output section 105 for the pattern control data to be returned to the central control unit 1. The pattern setting terminal unit 9 is constituted by a transmission signal transmitting/receiving section 100 for transmitting/receiving a time-division multiplex signal transmitted through the signal line 4, insulating sections 101a and 101b functioning as insulated photocouplers for signal transmission, a central control section 102 for performing signal processing, a data storage section 103 for storing the input data or the confirmation pattern control data sent from the central control unit 1, and I/O sections 104a to 104c for controlling the input and output of data. Data set by a switching section 107 of a data input section 105 is fetched through the I/O section 104a, and, at the same time, the set data is sent to a display control section 108. The data stored in the data storage 103 can be suitably sent out through the I/O section 104b. In this embodiment, the output data can be printed out at a data output section 106 composed of a printer. All of the circuits in the pattern setting terminal unit 9 except the transmission signal transmitting/receiving section 100 are energized from a terminal electric source (not shown) equipped in the pattern setting terminal unit 9.

Figure 32:
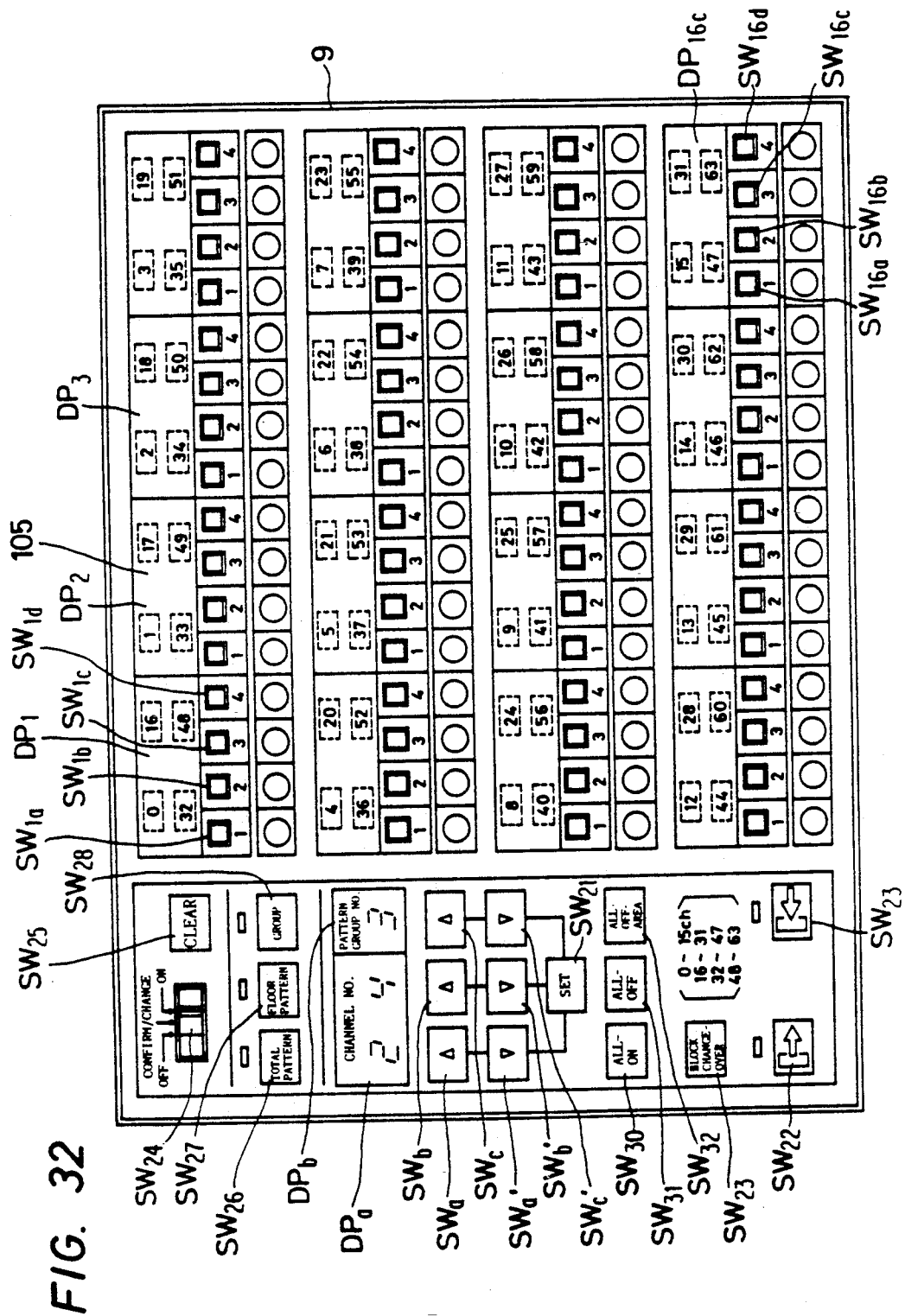
FIG. 32 is a front view of a switch panel.

FIG. 32 is a front view of a switch panel of the data input section 105. The switch panel is provided with load selection switches SWa,SWa', SWb,SWB', $SW_{1a}$-$SW_{1d}$, . . . $SW_{16a}$-$SW_{16d}$ for selecting the respective loads of the control terminal units 3 divided into a plurality of blocks, a block changeover switch $SW_{20}$ for selecting one block from among the plurality of blocks, a data setting switch $SW_{21}$ for storing the selected data, a data returning switch $SW_{22}$ for returning the stored data to the central control unit 1, and a data transfer switch $SW_{23}$ for transferring the pattern control data from the central control unit 1 to the pattern setting terminal unit 9. In the drawing, each of the number setting switches SWc and SWc' is provided in the form of a push-button switch for selecting a pattern number or a group number by pushing a suitable one of UP and DOWN buttons. The mode changeover switch $SW_{24}$ is provided in the form of a slide switch for selecting a suitable mode from among an initializing mode, a confirmation and changing mode, and an ordinary mode. The clear switch $SW_{25}$ is a button push switch for clearing the input data (the load number, which is the channel number in the illustrated example, indicated in the display section DP1 to DP16). The switches $SW_{26}$, $SW_{27}$ and $SW_{28}$ are a total pattern switch, a floor pattern switch and a group switch, respectively, for setting the classification of the pattern control data. Each of the all-on (all lights ON) switch $SW_{30}$, the all-off (all lights OFF) switch $SW_{31}$ and the all-off-area switch $SW_{32}$ is a button push switch for simplifying the specific data input in the setting of the total pattern. The display sections $DP_1$-$DP_{16}$ are provided to indicate the load number (channel number) 0-15 ch., 16-31 ch., 32-47 ch., and 48-63 ch., of the control terminal units 3 classified into four blocks.

The operation of the pattern setting terminal unit 9 will now be described.

In setting the pattern control data from the data input section 105, the mode changeover switch $SW_{24}$ is set to the initializing mode and then the classification of pattern control is selected by the switches $SW_{26}$-$SW_{28}$. Succeedingly, the pattern number corresponding to the pattern switches is set by the number setting switches SWc and SWc' and, at the same time, the block is selected by the block changeover switch $SW_{20}$. The terminal unit number (channel number) of the control terminal unit 3 is set by the switches SWa,SWa', SWb,SWb' and, at the same time, the load circuit number of the respective control terminal unit 3 to be turned on is set by the switches $SW_{1a}$-$SW_{1d}$ ... $SW_{16a}$-$SW_{16d}$.

After the aforementioned setting operation has been completed, the setting switch $SW_{21}$ is pushed to thereby store the pattern, control data in the data storage section 103. The input of pattern control data is completed by repeating the setting procedure.

In the case where the loads to be turned on are selected as described above, the number of the control terminal units 3 included in the block selected by the block changeover switch $SW_{20}$ is indicated by the display sections $GP_1$-$GP_{/6}$. When, for example, the first block is selected by the operation of the block changeover switch $SW_{20}$, light-emitting diodes corresponding to the terminal unit numbers 0-15 are operated to indicate that the load circuits (four respective circuits) of the terminal numbers 0-15 can be selected by the switches $SW_{1a}$-$SW_{1d}$ ... $SW_{16a}$-$SW_{16d}$. When, for example, the second block is selected by the operation of the block changeover switch $SW_{20}$, light-emitting diodes corresponding to the terminal unit numbers 16-31 are operated to indicate that the load circuits of the control terminal units of the terminal numbers 0-15 can be selected by the switches $Sw_{1a}$-$SW_{1d}$ ... $Sw_{16a}$-$Sw_{16d}$. The same indication is made in the case where the third or fourth block is selected by pushing the block changeover switch $SW_{20}$. The pattern control data set as described above is returned to the central control unit 1 through the transmission signal transmitting/receiving section 100 and the signal line 4 by pushing the data transfer switch $SW_{22}$ so that the data is stored in the pattern control data storage memory in the central control unit 1.

On the other hand, in the case where confirmation or change of the set pattern control data is required, the transmission request signal f or transmission of the pattern control data stored in the memory in the central control unit 1 is sent out from the pattern setting terminal unit 9 by pushing the data transfer switch $SW_{23}$. The transmission signal transmitting/receiving section 100 receives the data transmitted from the central control unit 1, and the data is stored in the data storage section 103. Confirmation of the pattern control data can be made by printing out the data stored in the data storage section 103. Further, the pattern control data can be changed by the operation of the switching section 107 in the same manner as that used during initialization. If the changed pattern control data is returned to the central control unit 1 by pushing the data transfer switch $SW_{22}$, the pattern control data stored in the memory in the central control unit 1 can be rewritten so that collective pattern control of the loads can subsequently be effected on the basis of the updated pattern control data. Of course, a device for printing out the updated pattern control data stored in the data storage section 103 by the initialization and change procedure may be provided.

As described above, according to this embodiment of the present invention, setting and changing of the pattern control data can be carried, out easily by the switching operation in the data input section 105 of the pattern setting terminal unit 9. Because the pattern control data can be stored in the memory in the central control unit 1, a plurality of loads can be collectively controlled merely by pushing the pattern control switch. Accordingly, the setting of the loads can be effected relatively easily compared with the conventional system in which the plurality of loads must be set individually. Furthermore, the setting switches can be reduced in number.

Figure 33:
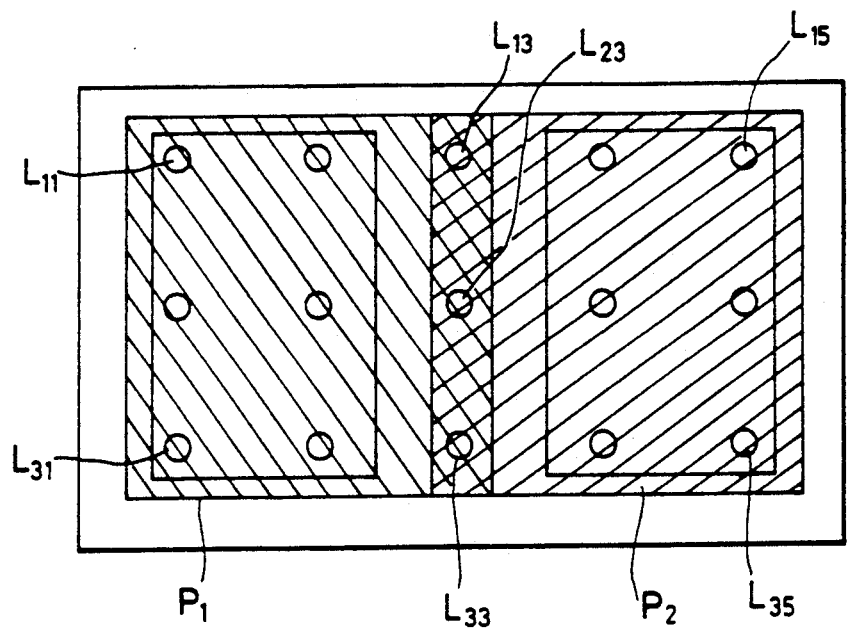
FIG. 33 shows a lighting pattern.

In the case where a plurality of pattern controlling operations are carried out by the on/off switch pushing operations on the basis of the pattern control data stored in the memory in the central control unit 1, and when some load is common to the plurality of pattern controlling operations, a problem arises in that a control error can occur in the common load. When, for example, lighting loads $L_{11}$-$L_{35}$ of, for instance, a gymnasium are to be controlled by two different lighting patterns $P_1$ and $P_2$ as shown in FIG. 33, lighting loads $L_{13}$, $L_{23}$ and $L_{33}$ common to both lighting patterns $P_1$ and $P_2$ must be controlled by both lighting patterns $P_1$ and $P_2$. However, there arises a problem in that the common lighting loads are turned off when, for example, the lighting state is shifted from the full state by both patterns to the off state by one pattern $P_1$ (or $P_2$). In other words, a problem arises in that the common lighting loads $L_{13}$, $L_{23}$ and $L_{33}$ to be turned on with the activation of one lighting pattern $P_1$ (or $P_2$) are undesirably turned Off during the off operation of the pattern control switch of the other lighting pattern $P_2$ (or $P_1$), thereby making the required lighting control operation impossible.

In this embodiment, in order to eliminate this problem, a control error checking unit is provided in the central control unit 1. When one of the lighting patterns $P_1$ (or $P_2$) is to turn a lighting load off, the control error checking unit judges whether lighting control by another lighting pattern $P_2$ (or $P_1$) is in effect or not. When lighting control by another lighting pattern is in effect, the common lighting loads $L_{13}$, $L_{23}$ and $L_{33}$ are prevented from being turned off.

Figure 34:
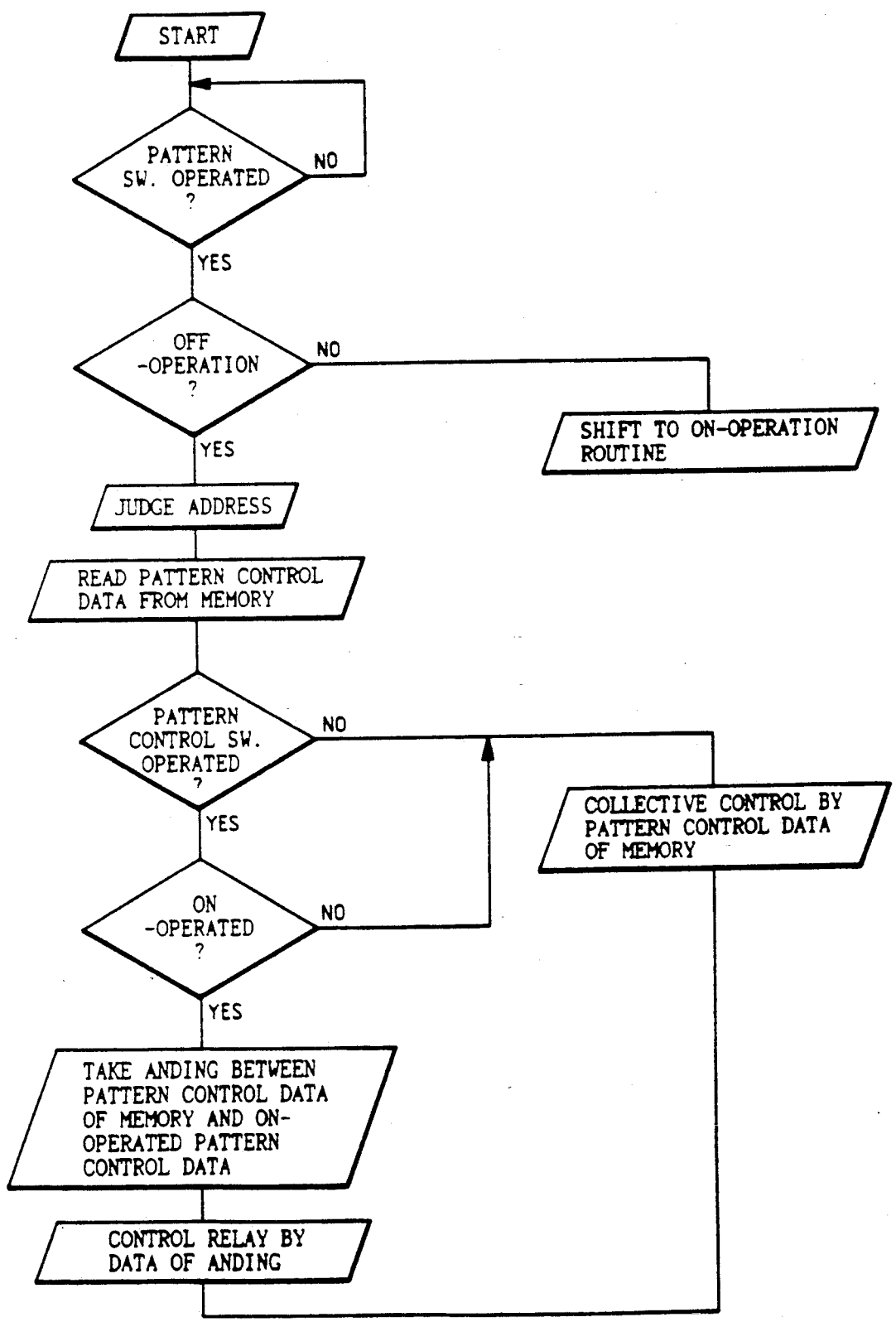
FIG. 34 in a flowchart for explaining the operation of a control error checking unit.
Figure 37:
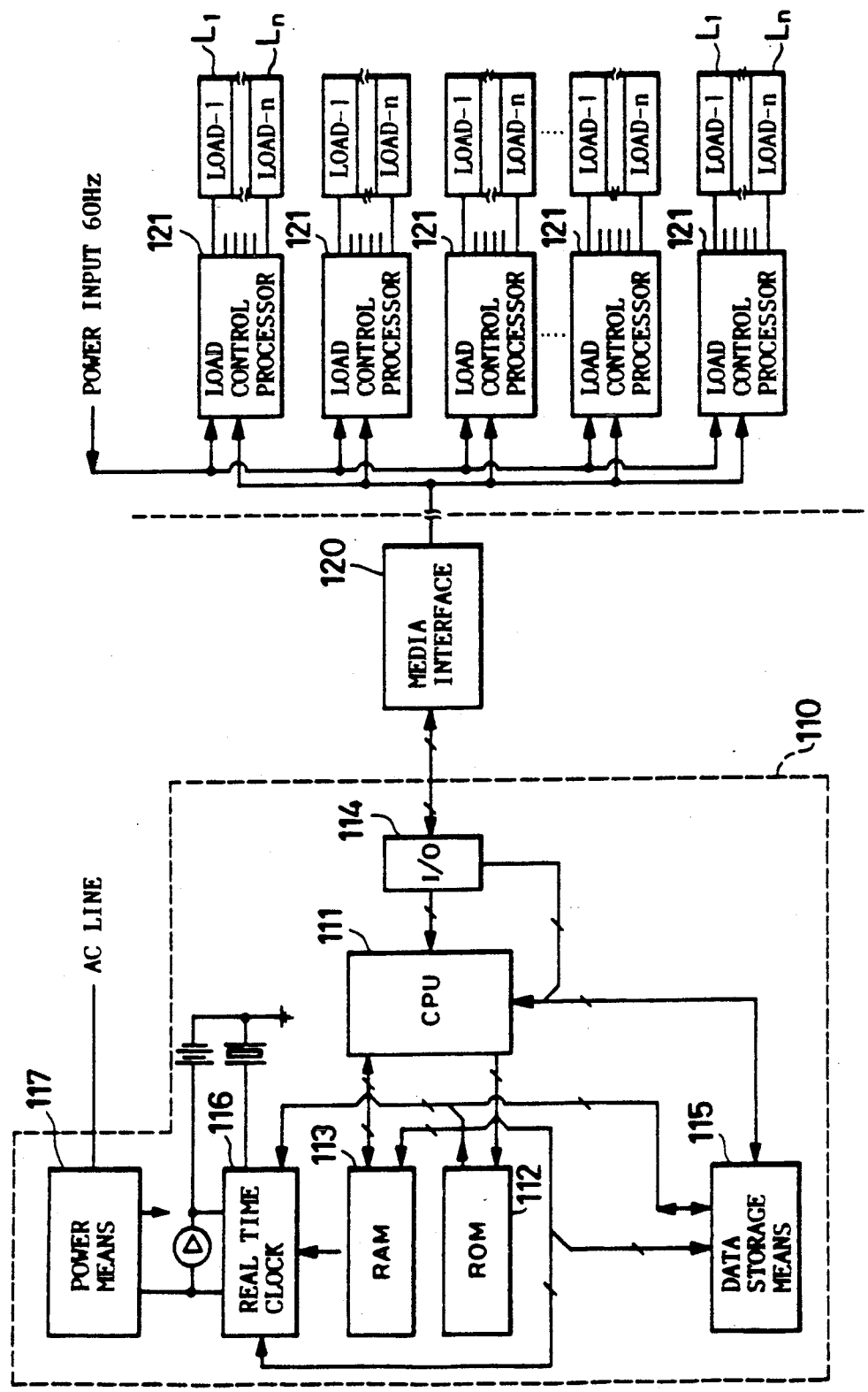
FIG. 37 is a schematic diagram showing a prior art system.

FIG. 34 is a flowchart showing the operation of the control error checking unit. When, for example, the operation of some pattern control switch is detected, the checking unit judges whether the operation is ON or OFF operation. When the operation is an ON operation, an ON operation routine is executed ordinarily. When the operation is an OFF operation, an OFF operation routine for turning off the indicated lighting loads with prevention of operational error is executed. In the OFF operation routine, the address (address of the monitor terminal unit 2) of the pattern control switch pushed off is identified and, on the basis of the address, predetermined data is read from the memory having pattern control data stored therein. Next, a judgment as to whether the ON operation of the other pattern control switch is in effect or not is carried out to maintain control of the common lighting loads $L_{13}$, $L_{23}$ and $L_{33}$ in the normal manner. When control by another lighting pattern is not in effect, OFF control of the lighting loads is collectively carried out on the basis of the pattern control data read from the memory. Otherwise, when control by another lighting pattern is in effect, OFF operation control of the lighting loads is only partly carried out in order not to turn off the common lightings $L_{13}$, $L_{23}$ and $L_{33}$. This is done by ANDing the two pattern control data. Accordingly, operational errors occurring when an OFF operation in one lighting pattern is made, the common lighting loads to be kept in the ON state by the other lighting pattern are undesiredly turned off are prevented.

Figure 35:
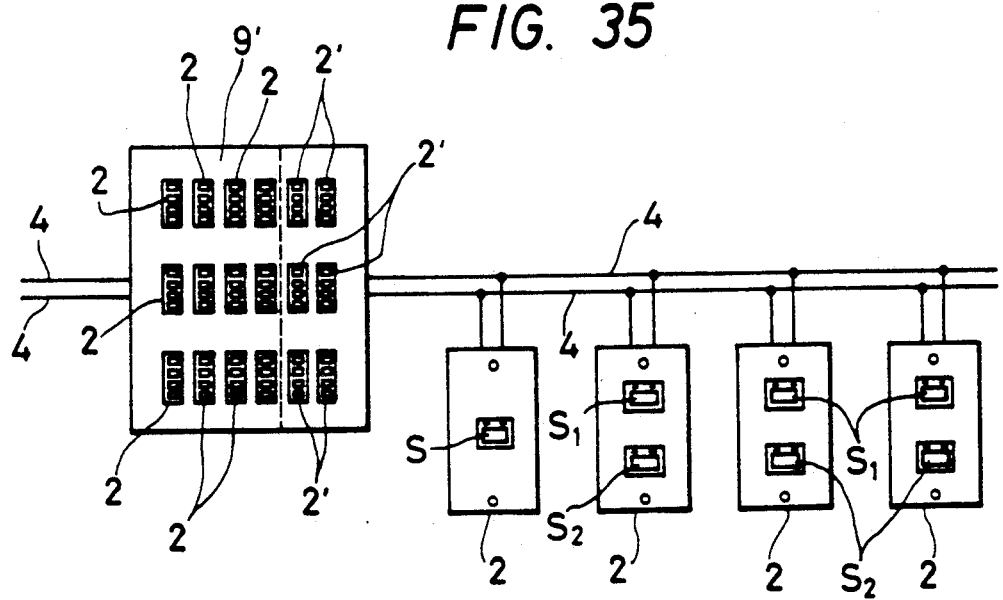
FIG. 35 is a schematic diagram showing a further embodiment.

FIGS. 35 and 36 show another data setting unit, in which a pattern setting terminal unit 9' is employed. In this case, monitor terminal units 2' for pattern control switches including a data setting function are provided in a switch panel section in which individual control switches $S_1$–$S_4$ monitored by the respective monitor terminal units 2 are collectively arranged. An ordinary/setting changeover switch $SW_{30}$ and an initialization/change changeover switch $SW_{31}$ are provided in the respective monitor terminal units 2'. Although this embodiment illustrates the case where three pattern control switches are monitored by each monitor terminal unit 2', it is a matter of course that the number of pattern control switches to be monitored is not limited.

When, for example, the ordinary/setting changeover switch $SW_{30}$ is pushed on to establish the setting mode, the setting of the pattern control data can be made by the use of the individual control switches $S_1$–$S_4$. In the case where the setting is initialization, all predetermined pattern data are cleared by turning the initial/change changeover switch $SW_{31}$ to the initializing mode, whereby data input for initialization can be made easily. In the case where the setting is a change mode, all predetermined pattern control data are displayed in the operational display section, whereby data change can be effected easily. Accordingly, initialization and change of the pattern control data can be carried out easily corresponding to the change of the layout of, for example, the area in which the lighting loads are located.

As described above, according to the present invention, in a remote supervisory and controlling system including a central control unit and a plurality of terminal units, the plurality of terminal units being connected to the central control unit through a two-wire signal line and the central control unit sends out a transmission signal including an address data signal for calling each of the terminal units, a control data signal for controlling a load associated with each of the terminal units, a return wait signal for setting a period of returning a monitor data signal from each of the terminal units to thereby perform time-divisional multiplex transmission of monitor data and control data between the central control unit and each of the terminal units, there is provided an external interface for time-divisional data transmission through the signal line between the central control unit and an external control unit such as a host computer, whereby a plurality of external control units can be desirably connected to the system to thereby perform load supervision and control from a plurality of places. As a result, the overall system can still be successfully operated, even if one of the external control units fails.

Further, load control and operational display can be carried out easily without requiring the provision of monitor terminal units or operational display terminal units having exclusive-use operational switches. Furthermore, a large—scale system can be constructed easily.

Also, the present invention provides a remote supervisory and controlling system in which control can be carried out using an optical wireless signal so that the change of the controlling operation can be made easily corresponding to the change of the layout.

Still further, the present invention provides a remote supervisory and controlling system in which the input of pattern control data is made simply.

What is claimed is:

1. A remote supervisory and controlling system comprising:
   a central control unit;
   a plurality of terminal units, said plurality of terminal units being connected to said central control unit through a two-wire signal line and said central control unit sends out a transmission signal including an address data signal for calling each of said terminal units, a control data signal for controlling a separate load coupled to each of said terminal units, a return wait signal for setting a period of returning a monitor data signal from each of said terminal units thereby to perform time-divisional multiplex transmission of monitor data and control data between said central control unit and each of said terminal units; and
   a pattern setting terminal unit for setting a pattern of operational states for a plurality of loads and provided with a data input/output section for transmitting pattern control data directly to said central control unit via said two-wire signal line to be stored in said central control unit and applied by said central control unit to control operational states of said loads, said pattern setting terminal unit comprising setting means for setting said pattern control data for said loads to be controlled, said central control unit controlling said plurality of loads collectively based on said pattern control data set by said setting means and in response to an operation of a pattern control switch, and wherein said central control unit comprises control error checking and preventing means for checking and preventing a control error of a load common to a plurality of pattern controlling operations.

2. A remote supervisory and controlling system as claimed in claim 1, wherein said data input/output section transmits said pattern control data to a data output section.

3. A remote supervisory and controlling system as claimed in claim 2, wherein said data output section comprises a printer.

4. A remote supervisory and controlling system as defined in claim 2, wherein said data input output section comprises switching means for switching said pattern control data.

* * * * *